(12) United States Patent
Kwag

(10) Patent No.: US 11,742,534 B2
(45) Date of Patent: Aug. 29, 2023

(54) BATTERY PACK

(71) Applicant: Samsung SDI Co., Ltd., Yongin-si (KR)

(72) Inventor: Nohyun Kwag, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/595,906

(22) Filed: Oct. 8, 2019

(65) Prior Publication Data

US 2020/0112007 A1   Apr. 9, 2020

(30) Foreign Application Priority Data

Oct. 8, 2018  (KR) .................. 10-2018-0119750

(51) Int. Cl.
| | |
|---|---|
| *H01M 50/20* | (2021.01) |
| *H01M 10/613* | (2014.01) |
| *H01M 10/625* | (2014.01) |
| *H01M 10/643* | (2014.01) |

(Continued)

(52) U.S. Cl.
CPC ......... *H01M 50/20* (2021.01); *H01M 10/613* (2015.04); *H01M 10/625* (2015.04); *H01M 10/643* (2015.04); *H01M 10/6567* (2015.04); *H01M 50/394* (2021.01); *H01M 2220/20* (2013.01)

(58) Field of Classification Search
None
See application file for complete search history.

(56) References Cited

U.S. PATENT DOCUMENTS

| 5,578,392 A | 11/1996 | Kawamura |
| 6,379,837 B1 | 4/2002 | Takahashi et al. |
| 7,924,562 B2 | 4/2011 | Soma et al. |

(Continued)

FOREIGN PATENT DOCUMENTS

| CN | 101192653 A | 6/2008 |
| CN | 1905267 B | 12/2010 |

(Continued)

OTHER PUBLICATIONS

Metals 2020, 10, 1315; doi:10.3390/met10101315 (Year: 2016).*

(Continued)

*Primary Examiner* — Maria Laios
*Assistant Examiner* — Bartholomew A Hornsby
(74) *Attorney, Agent, or Firm* — Lewis Roca Rothgerber Christie LLP

(57) ABSTRACT

A battery pack includes: battery cells including first battery cells and second battery cells, each of the first and second battery cells including a first end portion and a second end portion that are opposite each other in a length direction of the respective battery cell, adjacent first end portions being arranged in a stepped manner; and a case providing an accommodation space in which the battery cells and a cooling fluid to cool the battery cells are configured to be accommodated, the case including a first cover covering the first end portions of the battery cells, the first cover being arranged along a height difference between the first end portions of the first and second battery cells and defining a height difference space, corresponding to the height difference, on an outer side of the first cover.

24 Claims, 12 Drawing Sheets

(51) Int. Cl.
  *H01M 10/6567* (2014.01)
  *H01M 50/30* (2021.01)

(56) References Cited

U.S. PATENT DOCUMENTS

| | | | |
|---|---|---|---|
| 8,841,018 B2 | 9/2014 | Nakano et al. | |
| 9,105,900 B2 | 8/2015 | Kano | |
| 9,236,585 B2 | 1/2016 | Nishikawa et al. | |
| 9,406,983 B2 | 8/2016 | Mingers et al. | |
| 9,515,361 B2 | 12/2016 | Harada et al. | |
| 9,660,231 B2 | 5/2017 | Yoon | |
| 9,847,182 B2 | 12/2017 | Kusaba et al. | |
| 10,065,523 B2 | 9/2018 | Wood et al. | |
| 10,347,881 B2 | 7/2019 | Han | |
| 10,411,233 B2 | 9/2019 | Yoon et al. | |
| 10,944,138 B2 | 3/2021 | Hong et al. | |
| 11,081,894 B2 | 8/2021 | Cheon et al. | |
| 11,362,390 B2 | 6/2022 | Kwag | |
| 2007/0026303 A1 | 2/2007 | Jeon et al. | |
| 2008/0131767 A1 | 6/2008 | Kim | |
| 2008/0311468 A1 | 12/2008 | Hermann et al. | |
| 2009/0059528 A1 | 3/2009 | Damsohn et al. | |
| 2009/0202897 A1* | 8/2009 | Kim | H01M 10/613 429/120 |
| 2011/0008667 A1 | 1/2011 | Kwag et al. | |
| 2011/0027631 A1 | 2/2011 | Koenigsmann | |
| 2011/0165446 A1 | 7/2011 | Hermann | |
| 2011/0195284 A1 | 8/2011 | Tasui et al. | |
| 2011/0305930 A1 | 12/2011 | Han | |
| 2012/0251872 A1* | 10/2012 | Kim | H01M 50/20 429/159 |
| 2012/0315507 A1 | 12/2012 | Kim | |
| 2013/0136965 A1 | 5/2013 | Nakano et al. | |
| 2014/0093755 A1 | 4/2014 | Houchin-Miller et al. | |
| 2015/0056487 A1 | 2/2015 | Kobayashi et al. | |
| 2015/0118530 A1 | 4/2015 | Lee | |
| 2015/0255225 A1 | 9/2015 | Kusaba et al. | |
| 2017/0025717 A1 | 1/2017 | Zeller et al. | |
| 2018/0301771 A1 | 10/2018 | Jennrich et al. | |
| 2019/0067655 A1* | 2/2019 | Nakamura | H01M 10/613 |
| 2019/0379213 A1 | 12/2019 | Cheon et al. | |
| 2020/0044200 A1 | 2/2020 | Ochs et al. | |
| 2020/0112000 A1 | 4/2020 | Kwag | |
| 2020/0112007 A1 | 4/2020 | Kwag | |
| 2020/0127350 A1 | 4/2020 | Lee et al. | |

FOREIGN PATENT DOCUMENTS

| | | |
|---|---|---|
| CN | 102324770 A | 1/2012 |
| CN | 202550023 U | 11/2012 |
| CN | 103247766 A | 8/2013 |
| CN | 103563124 A | 2/2014 |
| CN | 104471784 A | 3/2015 |
| CN | 105118937 A | 12/2015 |
| CN | 105489796 A | 4/2016 |
| CN | 106169544 A | 11/2016 |
| CN | 107170945 A | 9/2017 |
| CN | 107394315 A | 11/2017 |
| CN | 207116551 U | 3/2018 |
| CN | 207183378 U | 4/2018 |
| CN | 210897381 U | 6/2020 |
| CN | 210956735 U | 7/2020 |
| CN | 210956830 U | 7/2020 |
| CN | 211062826 U | 7/2020 |
| DE | 10 2008 010 820 A1 | 8/2009 |
| DE | 102008010820 A1 | 8/2009 |
| DE | 102008059967 A1 | 6/2010 |
| DE | 102009035487 A1 | 2/2011 |
| DE | 10-2016-219302 A1 | 4/2018 |
| EP | 2302726 A1 | 3/2011 |
| EP | 2357688 A1 | 8/2011 |
| EP | 2866295 A1 | 4/2015 |
| EP | 3217452 A1 | 9/2017 |
| JP | 1999-67178 A | 3/1999 |
| JP | 4025928 B2 | 10/2007 |
| JP | 2010-97836 A | 4/2010 |
| JP | 4631118 B2 | 11/2010 |
| JP | 4791076 B2 | 7/2011 |
| JP | 5057720 B2 | 8/2012 |
| JP | 5173227 B2 | 1/2013 |
| JP | 2013-114780 A | 6/2013 |
| JP | 2014-197452 A | 10/2014 |
| JP | 2015-133266 A | 7/2015 |
| KR | 10-2010-0057691 A | 5/2010 |
| KR | 10-2012-0082579 A | 7/2012 |
| KR | 10-2013-0035200 A | 4/2013 |
| KR | 10-2015-0054532 A | 5/2015 |
| KR | 10-2015-0070241 A | 6/2015 |
| KR | 10-2017-0018448 A | 2/2017 |
| KR | 10-2017-0106933 A | 9/2017 |
| KR | 20170106933 A * | 9/2017 |
| KR | 10-2018-0063113 A | 6/2018 |
| KR | 10-2018-0092191 A | 8/2018 |
| WO | WO 2013/018151 A1 | 2/2013 |
| WO | WO 2013/124889 A1 | 8/2013 |
| WO | WO 2015/094035 A1 | 6/2015 |
| WO | 2016/185970 A1 | 11/2016 |
| WO | WO 2017/069397 A1 | 4/2017 |
| WO | 2017/175487 A1 | 10/2017 |
| WO | WO 2018/147545 A1 | 8/2018 |

OTHER PUBLICATIONS

EPO Extended European Search Report dated Aug. 4, 2020, issued in European Patent Application No. 19202014.7 (12 pages).
Korean Office Action dated Oct. 5, 2020, issued in Korean Patent Application No. 10-2020-0099831 (11 pages).
EPO Extended Search Report dated Apr. 17, 2020, corresponding to European Patent Application No. 19202074.1 (5 pages).
Korean Office Action dated Nov. 26, 2019, corresponding to Korean Patent Application No. 10-2018-0123928 (56 pages).
EPO Office Action dated Dec. 10, 2020, issued in European Patent Application No. 19202070.9 (5 pages).
EPO Extended Search Report dated Mar. 20, 2020, corresponding to European Patent Application No. 19202014.7 (15 pages).
EPO Extended Search Report dated Feb. 28, 2020, for corresponding European Patent Application No. 19202039.4 (5 pages).
EPO Extended Search Report dated Feb. 28, 2020, corresponding to European Patent Application No. 19202070.9 (8 pages).
U.S. Office Action dated Jun. 25, 2021, issued in U.S. Appl. No. 16/596,503 (15 pages).
Translation DE 102008059967 (Year: 2021).
Translation DE 102008010820 (Year: 2021).
Translation DE 102009035487 (Year: 2021).
U.S. Office Action dated Aug. 20, 2021, issued in U.S. Appl. No. 16/596,583 (13 pages).
U.S. Final Office Action dated Nov. 12, 2021, issued in U.S. Appl. No. 16/596,503 (15 pages).
U.S. Notice of Allowance from Application No. 16/596,583, dated Jan. 12, 2022, 7 pages.
Chinese Office Action for CN Application No. 201910949727.7 dated Apr. 24, 2022, 6 pages.
English Translation of Chinese Office Action for CN Application No. 201910949727.7 dated Apr. 24, 2022, 6 pages.
Office Action for U.S. Appl. No. 16/595,900 dated May 18, 2022, 18 pages.
Restriction Requirement for U.S. Application No. 16/595,900 dated Dec. 13, 2021, 6 pages.
Restriction Requirement for U.S. Application No. 16/596,503 dated Apr. 6, 2021, 7 pages.
Chinese Office Action, with English translation, dated Apr. 29, 2022, issued in Chinese Patent Application No. 201910949797.2 (25 pages).
Chinese Office Action, with English translation, dated May 7, 2022, issued in Chinese Patent Application No. 201910949820.8 (22 pages).
U.S. Office Action dated Oct. 25, 2022, issued in U.S. Appl. No. 16/596,503 (19 pages).

(56) References Cited

OTHER PUBLICATIONS

Chinese Office Action, with English translation, dated Aug. 2, 2022, issued in Chinese Patent Application No. 201910950782.8, 14 pages.
U.S. Notice of Allowance dated Nov. 9, 2022, issued in U.S. Appl. No. 16/595,900, 13 pages.
Chinese Office Action, with English translation, dated Nov. 1, 2022, issued in Chinese Patent Application No. 201910949797.2, 7 pages.
Chinese Office Action, with English translation, dated Nov. 11, 2022 issued in Chinese Patent Application No. 201910949820.8 (15 pages).
EPO European Office Action dated Jan. 30, 2023, issued in European Patent Application No. 19202070.9 (4 pages).
Chinese Notice of Allowance dated Jan. 18, 2023, issued in corresponding Chinese Patent Application No. 201910949727.7 (4 pages).
Chinese Notice of Allowance dated Jan. 18, 2023, issued in Chinese Patent Application No. 201910950782.8, 14 pages.
U.S. Notice of Allowance dated Feb. 17, 2023, issued in U.S. Appl. No. 16/596,503 (8 pages).
U.S. Notice of Allowance dated Feb. 28, 2023, issued in U.S. Appl. No. 16/595,900 (12 pages).
Chinese Office Action with English translation for CN Application No. 201910949820.8 dated Feb. 11, 2023, 7 pages.
Korean Office Action dated Apr. 27, 2023, issued in corresponding Korean Patent Application No. 10-2018-0119750 (4 pages).

\* cited by examiner

BATTERY PACK

CROSS-REFERENCE TO RELATED APPLICATIONS

This application claims priority to and the benefit of Korean Patent Application No. 10-2018-0119750, filed on Oct. 8, 2018 in the Korean Intellectual Property Office, the entire disclosure of which is incorporated herein by reference. This application also incorporates, in their entirety, by reference U.S. application Ser. No. 16/596,503, U.S. application Ser. No. 16/596,583, and U.S. application Ser. No. 16/595,900, filed on even date herewith.

BACKGROUND

1. Field

Aspects of one or more embodiments relate to a battery pack.

2. Description of the Related Art

In general, secondary batteries are rechargeable, unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs) in which a plurality of battery cells are electrically connected are used according to the types of external devices that use the secondary batteries.

Small mobile devices, such as cellular phones, may be operated for a certain time (e.g., a predetermined time) using single-cell secondary batteries. However, multi-cell secondary batteries (secondary battery packs) having high-output, high-capacity features may be suitable for devices having long operating times and requiring high power, such as electric vehicles or hybrid electric vehicles, consuming large amounts of power. The output voltage or current of a battery pack may be increased by adjusting the number of batteries (battery cells) included in the battery pack.

SUMMARY

According to an aspect of one or more embodiments, a battery pack includes emission or discharge passages for discharging gas from battery cells without using additional ribs or ducts.

Additional aspects will be set forth, in part, in the description which follows and, in part, will be apparent from the description, or may be learned by practice of the presented embodiments.

According to one or more embodiments, a battery pack includes: battery cells including first battery cells and second battery cells, each of the first and second battery cells including a first end portion and a second end portion that are opposite each other in a length direction of the respective battery cell, adjacent first end portions being arranged in a stepped manner; and a case providing an accommodation space in which the battery cells and a cooling fluid to cool the battery cells are configured to be accommodated, the case including a first cover covering the first end portions of the battery cells, the first cover being arranged along a height difference between the first end portions of the first and second battery cells and defining a height difference space, corresponding to the height difference, on an outer side of the first cover.

The first end portion of the first battery cell may relatively protrude, and the first end portion of the second battery cell may be relatively recessed.

The first cover may include: a protruding portion that may relatively protrude to cover the first end portion of the first battery cell; a recessed portion that may be relatively recessed to cover the first end portion of the second battery cell; and a stepped portion connecting the protruding portion and the recessed portion to each other while extending along the height difference between the first end portions of the first and second battery cells, wherein the height difference space may be defined on an outer side of the recessed portion.

The height difference space may be defined on an outer side of the first end portion of the second battery cell that is relatively recessed.

The first end portion of the second battery cell may have a gas discharge hole.

The gas discharge hole may be around a center portion of the first end portion of the second battery cell, the center portion being electrically connected to a first tab plate.

The first cover may have a first terminal hole to expose the center portion and the gas discharge hole.

The gas discharge hole may be in communication with the height difference space through the first terminal hole.

The first and second battery cells may be adjacent to each other and arranged in rows, and the height difference space may include a channel crossing the first cover along a row of the second battery cells.

The first end portions of the first and second battery cells may have different electrical polarities and may be spatially stepped from each other.

The second end portion of the first battery cell may be relatively recessed, and the second end portion of the second battery cell may relatively protrude.

The case may further include a second cover covering the second end portions of the first and second battery cells, and the second cover may be arranged along a height difference between the second end portions of the first and second battery cells and may define another height difference space, corresponding to the height difference between the second end portions of the first and second battery cells, on an outer side of the second cover.

The battery pack may further include a first tab plate on an outer side of the first cover to electrically connect the first end portions of the first and second battery cells, and the height difference space may be defined between the first cover and the first tab plate.

The first tab plate may include: a main portion on the first cover; and first and second contact portions protruding to different depths from the main portion toward the first end portions of the first and second battery cells.

The first and second contact portions may be thinner than the main portion. The first and second contact portions may be respectively coupled to the first end portions of the first and second battery cells.

The first cover may have first terminal holes to respectively partially expose the first end portions of the first and second battery cells, the first contact portion may be connected to the first end portion of the first battery cell through the first terminal hole of the first cover, and the second contact portion may be connected to the first end portion of the second battery cell through the height difference space and the first terminal hole of the first cover.

The protruding depth of the second contact portion may be greater than the protruding depth of the first contact portion.

Each of the first and second contact portions may have a truncated cone shape with a cross-sectional area gradually decreasing along the protruding depth.

The first tab plate may connect a row of the first battery cells and a row of the second battery cells that are adjacent to each other; the first end portions of the first battery cells having the same polarity may be connected in parallel to each other, and the first end portions of the second battery cells having the same polarity may be connected in parallel to each other; the first end portions of the first and second battery cells having opposite polarities may be connected in series to each other; and a plurality of the first contact portions may be arranged in a row on the main portion, and a plurality of the second contact portions may be arranged in a row on the main portion.

The height difference between the first end portions of the first and second battery cells may be in a range of about 3 mm to about 12 mm. The height difference between the first end portions of the first and second battery cells may be in a range of about 4 mm to about 10 mm.

According to one or more embodiments, a battery pack includes: battery cells including first battery cells and second battery cells, each of the first and second battery cells including a first end portion and a second end portion that are opposite each other in a length direction of the respective battery cell; a case providing an accommodation space in which the battery cells and a cooling fluid to cool the battery cells are configured to be accommodated, the case comprising a first cover covering the first end portions of the battery cells; and a first tab plate on an outer side of the first cover to electrically connect the first end portions of the first and second battery cells, the first tab plate including a main portion on the first cover, and first and second contact portions protruding to different depths from the main portion toward the first end portions of the first and second battery cells, and the first and second contact portions are thinner than the main portion.

BRIEF DESCRIPTION OF THE DRAWINGS

These and/or other aspects will become apparent and more readily appreciated from the following description of some embodiments, taken in conjunction with the accompanying drawings in which.

DETAILED DESCRIPTION

Figure 1:
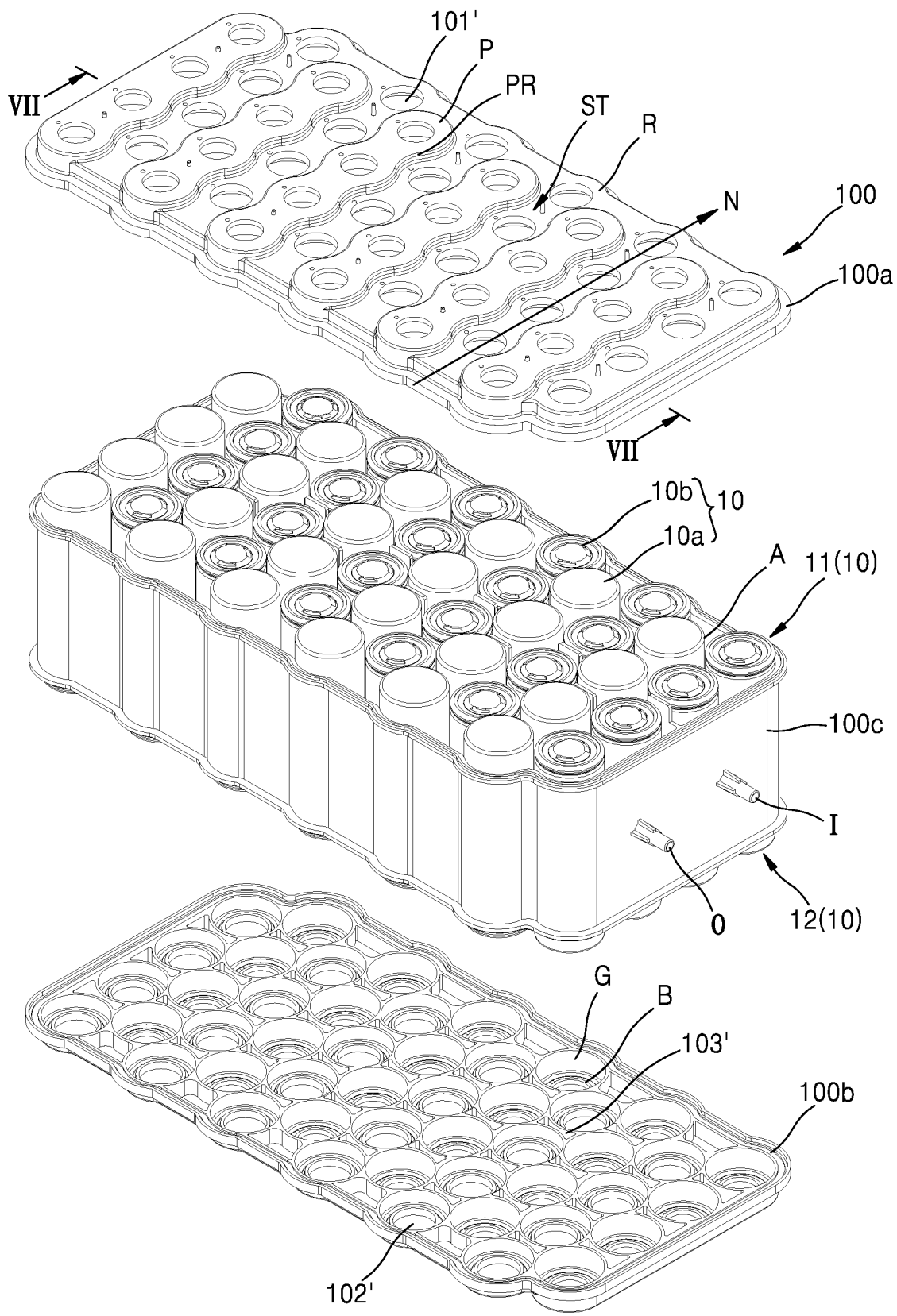
FIG. 1 is an exploded perspective view illustrating a battery pack according to an embodiment of the present disclosure.

Reference will now be made in further detail to some embodiments, examples of which are illustrated in the accompanying drawings, wherein like reference numerals refer to like elements throughout unless otherwise noted. Rather, these embodiments are provided as examples so that this disclosure will be thorough and complete, and will fully convey the aspects and features of the present invention to those skilled in the art. In this regard, the present embodiments may have different forms and should not be construed as being limited to the descriptions set forth herein. Accordingly, the embodiments are merely described below, by referring to the figures, to explain aspects of the present description. Moreover, processes, elements, and techniques that are not necessary to those having ordinary skill in the art for a complete understanding of the aspects and features of the present invention may not be described. In the drawings, the relative sizes of elements, layers, and regions may be exaggerated for clarity.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section described below could be termed a second element, component, region, layer, or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It is to be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

It is to be understood that when an element or layer is referred to as being "on," "connected to," or "coupled to" another element or layer, it can be directly on, connected to, or coupled to the other element or layer, or one or more intervening elements or layers may be present. In addition, it is also to be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It is to be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which the present invention belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Battery packs will now be described with reference to the accompanying drawings, in which some embodiments of the present disclosure are shown.

Figure 2:
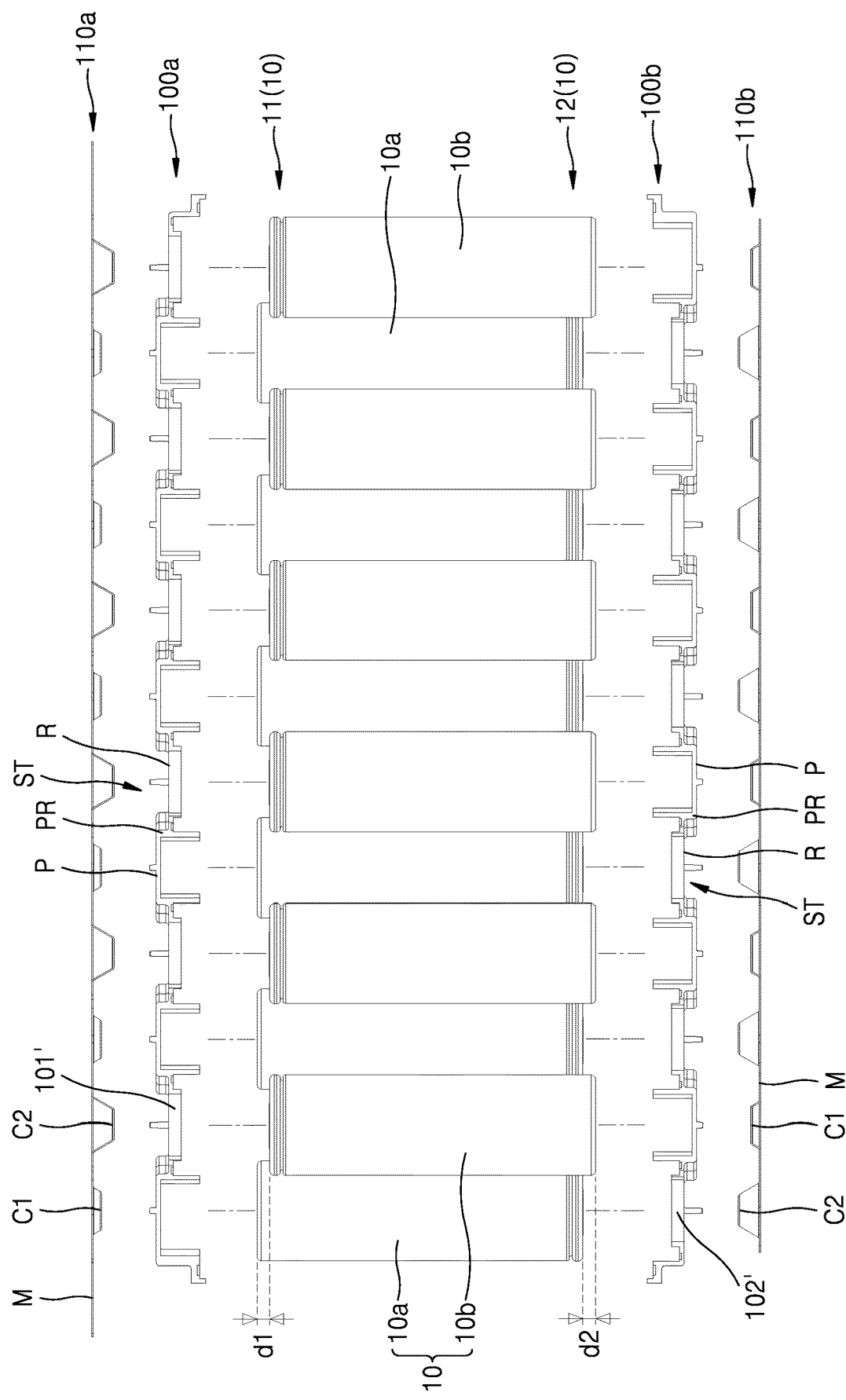
FIG. 2 is a view illustrating an arrangement of battery cells shown in FIG. 1.

FIG. 1 is an exploded perspective view illustrating a battery pack according to an embodiment of the present disclosure; and FIG. 2 is a view illustrating an arrangement of battery cells shown in FIG. 1.

Referring to FIG. 1, a battery pack of the present disclosure may include a plurality of battery cells 10 and a case 100 providing an accommodation space A in which the battery cells 10 and a cooling fluid for cooling the battery cells 10 are accommodated.

The case 100 may include first and second covers 100a and 100b which respectively cover first and second end portions 11 and 12 of the battery cells 10 corresponding to both ends of the battery cells 10 in a length direction of the battery cells 10. First and second terminal holes 101' and 102' may be formed in the first and second covers 100a and 100b to expose the first and second end portions 11 and 12 of the battery cells 10 therethrough, and the battery cells 10 may be electrically connected to each other through the first and second end portions 11 and 12 exposed through the first and second terminal holes 101' and 102'.

Referring to FIG. 2, the battery cells 10 may include first and second battery cells 10a and 10b that are arranged at offset levels in the length direction of the first and second battery cells 10a and 10b. In this case, the first and second battery cells 10a and 10b may have first end portions 11 adjacent to each other and second end portions 12 adjacent to each other and located opposite the first end portions 11, and the first and second end portions 11 and 12 may have height differences d1 and d2. Here, the first end portions 11 may refer to end portions of the battery cells 10 facing the first cover 100a, and the second end portions 12 may refer to the other end portions of the battery cells 10 facing the second cover 100b.

In an embodiment, the first and second battery cells 10a and 10b having the same length are arranged at offset levels in the length direction of the first and second battery cells 10a and 10b, and the height difference d1 between the first end portions 11 adjacent to each other may be equal to the height difference d2 between the second end portions 12 adjacent to each other, and the first and second battery cells 10a and 10b may be stepped in opposite directions. Therefore, the first battery cells 10a having relatively protruding first end portions 11 may have relatively recessed second end portions 12, and the second battery cells 10b having relatively recessed first end portions 11 may have relatively protruding second end portions 12. That is, when the first end portions 11 of the first battery cells 10a protrude outward more than the first end portions 11 of the second battery cells 10b, the second end portions 12 of the first battery cells 10a may be recessed inward more than the second end portions 12 of the second battery cells 10b by the protruding amount of the first end portions 11 of the first battery cells 10a.

For example, the height difference d1 between the adjacent first end portions 11 of the first and second battery cells 10a and 10b and the height difference d2 between the adjacent second end portions 12 of the first and second battery cells 10a and 10b may be within a range of about 3 mm to about 12 mm, for example, within a range of about 4 mm to about 10 mm. As described further later, in an embodiment, the height difference d1 between the adjacent first end portions 11 and the height difference d2 between the adjacent second end portions 12 may be within a range of about 3 mm or greater, for example, within a range of about 4 mm or greater, to provide a sufficient emission or discharge passage. In an embodiment, the height difference d1 between the adjacent first end portions 11 and the height difference d2 between the adjacent second end portions 12 may be about 12 mm or less, for example, about 10 mm or less, to prevent or substantially prevent a decrease in the energy density of the battery pack caused by excessive values of the height differences d1 and d2.

In an embodiment, the first and second battery cells 10a and 10b may be substantially the same battery cells 10 and may be arranged to reverse the polarities of the first and second end portions 11 and 12. That is, the first end portions 11 of the first and second battery cells 10a and 10b may have electrically opposite polarities, and the second end portions 12 of the first and second battery cells 10a and 10b may have electrically opposite polarities. In this case, since the first and second battery cells 10a and 10b are arranged such that the first and second end portions 11 and 12 may have opposite polarities and may be at offset levels, the first end portions 11 of the first and second battery cells 10a and 10b may have electrically opposite polarities and may spatially form the height difference d1, and, similarly, the second end portions 12 of the first and second battery cells 10a and 10b that are adjacent to each other at a side opposite the first end portions 11 may have electrically opposite polarities and may spatially form the height difference d2.

Referring to FIGS. 1 and 2, the first cover 100a may be placed on the first end portions 11 of the first and second battery cells 10a and 10b to cover the first end portions 11, and the second cover 100b may be placed on the second end portions 12 of the first and second battery cells 10a and 10b to cover the second end portions 12. In this case, the first cover 100a may form or define height difference spaces ST on an outer side of the first cover 100a while extending along the height difference d1 between the first end portions 11 of the first and second battery cells 10a and 10b, and, similarly, the second cover 100b may form or define other height difference spaces ST on an outer side of the second cover 100b while extending along the height difference d2 between the second end portions 12 of the first and second battery cells 10a and 10b.

In the following description, the height difference spaces ST formed on the outer side of the first cover 100a will be mainly described, but the description of the height difference spaces ST may apply to the height difference spaces ST formed on the outer side of the second cover 100b.

Referring to FIGS. 1 and 2, the first cover 100a may include: protruding portions P and recessed portions R that cover the first end portions 11 of the first and second battery cells 10a and 10b at different levels; and stepped portions PR extending along the height difference d1 between the first end portions 11 of the first and second battery cells 10a and 10b. In addition, the height difference spaces ST corresponding to the height difference d1 between the first end portions 11 of the first and second battery cells 10a and 10b may be formed on outer sides of the recessed portions R.

In an embodiment of the present disclosure, the protruding portions P may form a relatively protruding high level to cover the first end portions 11 of the first battery cells 10a that relatively protrude in a projecting shape or manner, and the recessed portions R may form a relatively recessed low level to cover the first end portions 11 of the second battery cells 10b that are relatively recessed in a sunken shape or manner. In addition, the stepped portions PR may connect the protruding portions P and the recessed portions R to each other while extending along the height difference d1 between the first end portions 11 of the first and second battery cells 10a and 10b. In this case, the height difference spaces ST may be formed on the outer sides of the recessed portions R formed at a relatively low level.

In an embodiment of the present disclosure, as shown in FIG. 1, the first and second battery cells 10a and 10b may be arranged in rows, and rows of the first battery cells 10a and rows of the second battery cells 10b may be arranged side by side at neighboring positions. In an embodiment of the present disclosure, the first and second battery cells 10a and 10b may be cylindrical battery cells and may be arranged in such a manner that the first battery cells 10a may be placed in valleys between the second battery cells 10b neighboring each other, and the second battery cells 10b may be placed in valleys between the first battery cells 10a neighboring each other, thereby decreasing an unnecessary space and increasing the energy density of the battery pack.

The protruding portions P of the first cover 100a may be formed along the rows of the first battery cells 10a having the first end portions 11 that relatively protrude, and may include first terminal holes 101' for electrical connection of the first battery cells 10a. The recessed portions R of the first cover 100a may be formed along the rows of the second battery cells 10b having the first end portions 11 that are relatively recessed, and may include first terminal holes 101' for electrical connection of the second battery cells 10b. Since the height difference spaces ST are formed on the outer sides of the recessed portions R, the height difference spaces ST may be formed in the shape of channels N (refer to FIG. 1) extending across the first cover 100a along the rows of the second battery cells 10b.

The height difference spaces ST of the first cover 100a may provide emission or discharge passages for discharging emission gas from the battery cells 10. For example, the height difference spaces ST of the first cover 100a may be formed on the outer sides of the recessed portions R and may be connected through the first terminal holes 101' to the first end portions 11 of the second battery cells 10b that are relatively recessed in a sunken shape at inner sides of the recessed portions R, thereby providing emission or discharge passages for discharging emission gas from the first end portions 11 of the second battery cells 10b.

Figure 3:
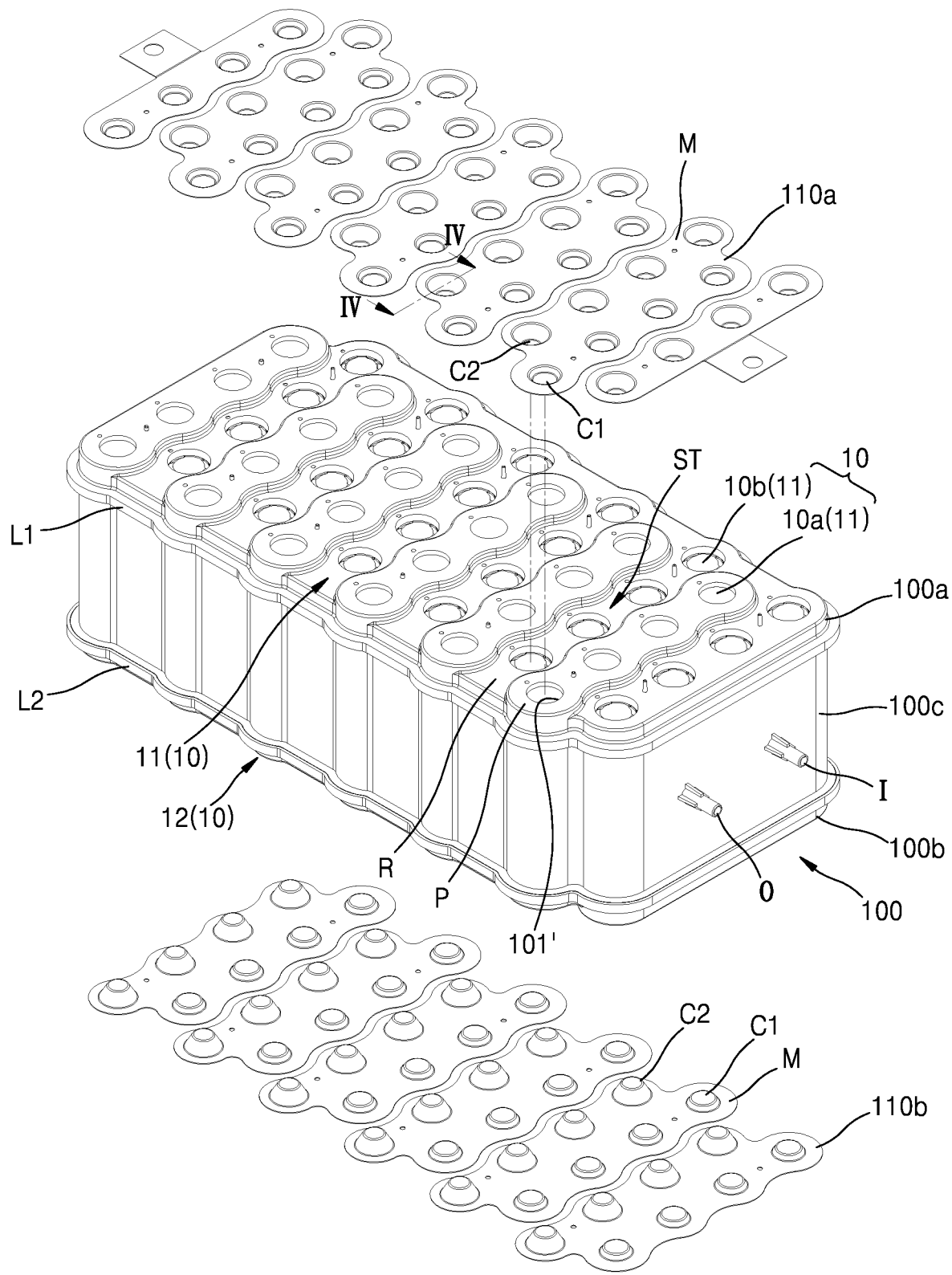
FIG. 3 is a perspective view illustrating height difference spaces of the battery pack shown in FIG. 1.
Figure 4:
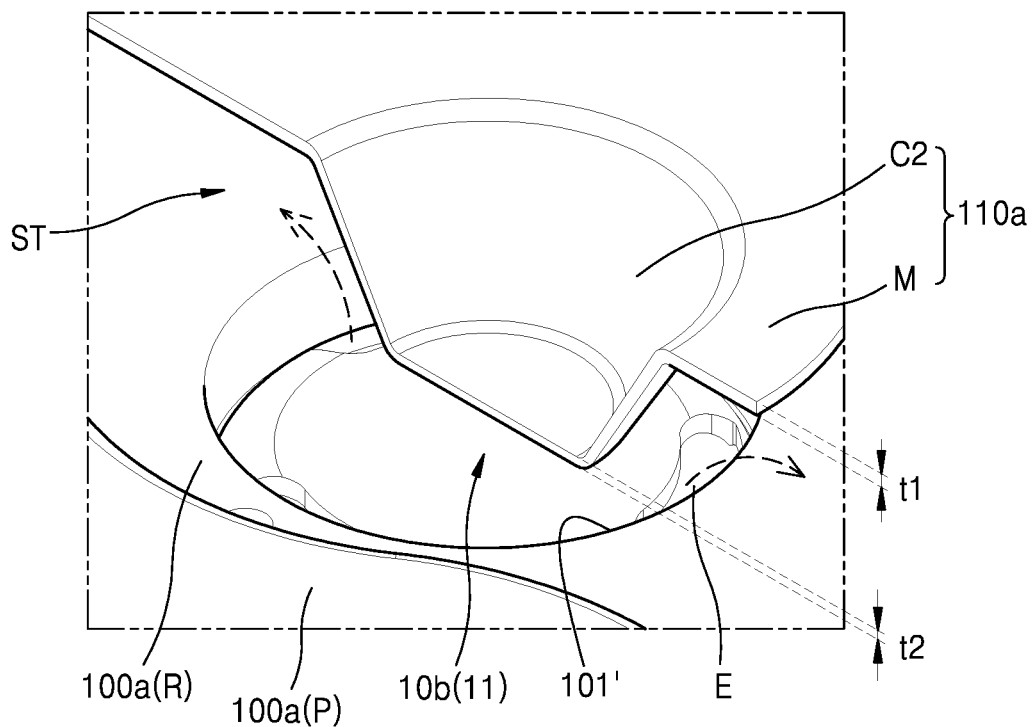
FIG. 4 is a cut-away view taken along the line IV-IV in FIG. 3 for illustrating gas discharged from a battery cell through a height difference space.

FIG. 3 is a perspective view illustrating the height difference spaces ST of the battery pack shown in FIG. 1; and FIG. 4 is a cut-away view taken along the line IV-IV in FIG. 3 for illustrating gas discharged from a battery cell 10 through a height difference space ST.

Referring to FIG. 3, a first tab plate 110a electrically connected to the first end portions 11 of the first and second battery cells 10a and 10b may be placed on the first cover 100a. Referring to FIG. 4, the first tab plate 110a may be connected to a first end portion 11 of a second battery cell 10b through a height difference space ST of the first cover 100a and a first terminal hole 101'. In this case, gas discharge holes E (or emission holes) may be formed around a center portion of the first end portion 11 of the second battery cell 10b which is coupled to the first tab plate 110a. In addition, the gas discharge holes E and the center portion of the first end portion 11 may be exposed through the first terminal hole 101', and the first terminal hole 101' may have a sufficiently large size (for example, diameter) for exposing all of the gas discharge holes E and the center portion of the first end portion 11.

The gas discharge holes E may be connected through the first terminal hole 101' to the height difference space ST formed on the outer side of the first cover 100a. For example, emission gas discharged through the first terminal hole 101' may be guided to the outside through the height difference space ST between the first cover 100a (for example, a recessed portion R) and the first tab plate 110a, and since the height difference space ST provides an emission or discharge passage connected to the first terminal hole 101', the height difference space ST may be considered as being located between the first cover 100a (for example, the recessed portion R) and the first tab plate 110a. In an embodiment, the first end portion 11 of the second battery cell 10b may be a positive electrode side in which the gas discharge holes E are formed.

Referring to FIG. 2, like the first cover 100a, the second cover 100b may extend along the height difference d2 between the second end portions 12 of the first and second battery cells 10a and 10b while covering the second end portions 12 of the first battery cells 10a and the second end portions 12 of the second battery cells 10b. Therefore, the height difference spaces ST corresponding to the height difference d2 between the second end portions 12 may be formed on the outer side of the second cover 100b. In this case, the height difference spaces ST may be formed on the second end portions 12 of the first battery cells 10a that are relatively recessed in a sunken shape.

The height difference spaces ST of the second cover 100b may provide emission or discharge passages for discharging emission gas from the battery cells 10. For example, the height difference spaces ST of the second cover 100b may be connected through the second terminal holes 102' to the second end portions 12 of the first battery cells 10a that are relatively recessed in a sunken shape at an inner side of the second cover 100b and may provide emission or discharge passages for discharging emission gas from the second end portions 12 of the first battery cells 10a. In an embodiment, other gas discharge holes E may be formed in the second end portions 12 of the first battery cells 10a to discharge emission gas accumulated in the first battery cells 10a, and the second end portions 12 of the first battery cells 10a may be positive electrode sides in which the gas discharge holes E are formed.

As described above, the height difference spaces ST of the first cover 100a may provide emission or discharge passages for discharging emission gas from the second battery cells 10b, and the height difference spaces ST of the second cover 100b may provide emission passages for discharging emission gas from the first battery cells 10a. Therefore, emission or discharge passages for the first and second battery cells 10a and 10b may be provided by the height difference spaces ST of the first cover 100a or the height difference spaces ST of the second cover 100b.

In an embodiment of the present disclosure, the first and second battery cells 10a and 10b are arranged adjacent to each other at offset levels to form the height difference d1 between the first end portions 11 and the height difference d2 between the second end portions 12 of the first and second battery cells 10a and 10b, and the height difference spaces ST are formed on the first end portions 11 or the second end portions 12 that are relatively recessed in a sunken shape to provide emission or discharge passages such that emission gas discharged through the first end portions 11 or the second end portions 12 that are relatively recessed in a sunken shape may be discharged to the outside through the height difference spaces ST. In this case, the gas discharge holes E may be formed in the first end portions 11 or the second end portions 12 that are relatively recessed in a sunken shape. In an embodiment of the present disclosure, the relatively recessed first end portions 11 of the second battery cells 10b and the relatively recessed second end portions 12 of the first battery cells 10a may form positive electrode sides in which the gas discharge holes E are formed, and the first end portions 11 of the first battery cells 10a and the second end portions 12 of the second battery cells 10b that relatively protrude in a projecting shape may form negative electrode sides.

Figure 5:
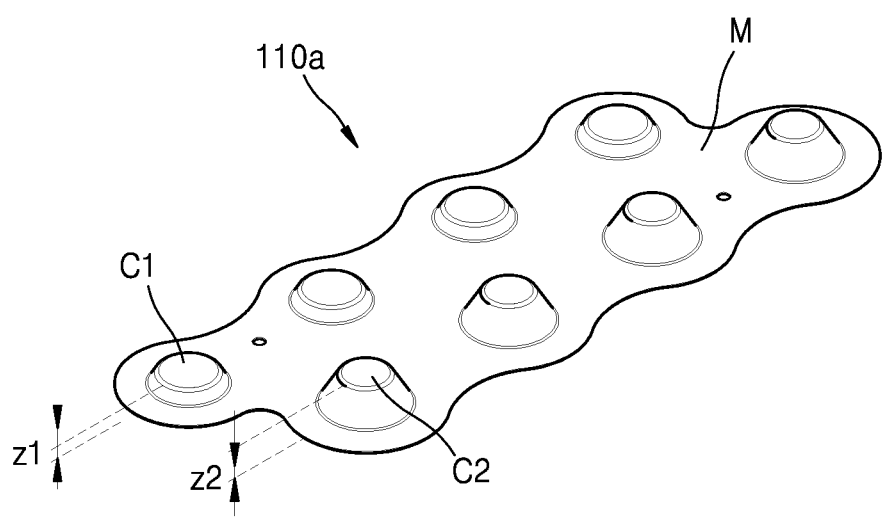
FIG. 5 is a perspective view illustrating a first tab plate shown in FIG. 3.

FIG. 5 is a perspective view illustrating the first tab plate 110a shown in FIG. 3.

Referring to FIGS. 3 and 5, the first tab plate 110a for electrically connecting the first end portions 11 of the first and second battery cells 10a and 10b may be placed on the outer side of the first cover 100a. The first tab plate 110a may include: a main portion M having a flat shape and configured to be placed on the first cover 100a; and first and second contact portions C1 and C2 protruding toward the first end portions 11 of the first and second battery cells 10a and 10b with different protruding depths.

The main portion M may be placed on the first cover 100a and may extend on the first cover 100a in a flat shape. In an embodiment, the main portion M may be fixed to a position on the first cover 100a owing to the first and second contact portions C1 and C2 respectively coupled to the first end portions 11 of the first and second battery cells 10a and 10b.

The first and second contact portions C1 and C2 may make contact with the first end portions 11 of the first and second battery cells 10a and 10b that are exposed through the first terminal holes 101', and may have sufficient depths for reaching the first end portions 11 of the first and second battery cells 10a and 10b.

The first contact portions C1 may extend from the main portion M placed on the first cover 100a and may be coupled to the relatively protruding first end portions 11 of the first battery cells 10a through the first terminal holes 101' formed in the first cover 100a (for example, formed in the protruding portions P). The second contact portions C2 may extend from the main portion M placed on the first cover 100a and may be coupled to the relatively recessed first end portions 11 of the second battery cells 10b through the height difference spaces ST formed on the outer side of the first cover 100a (for example, formed on the outer sides of the recessed portions R) and the first terminal holes 101'. As described above, the first and second contact portions C1 and C2 may protrude from the main portion M to different depths and may be coupled to the relatively protruding first end portions 11 of the first battery cells 10a and the relatively recessed first end portions 11 of the second battery cells 10b, and, as shown in FIG. 5, the protruding depth z2 of the second contact portions C2 may be greater than the protruding depth z1 of the first contact portions C1.

The first and second contact portions C1 and C2 are not placed in the same plane as the main portion M but protrude from the main portion M to different depths such that the first and second contact portions C1 and C2 may make contact with the first end portions 11 of the first and second battery cells 10a and 10b that are stepped. The first and second contact portions C1 and C2 protruding from the main portion M placed on the first cover 100a have sufficient depths to pass through the first terminal holes 101' for making contact with the first end portions 11 of the first and second battery cells 10a and 10b.

In an embodiment, each of the first and second contact portions C1 and C2 may be shaped like a truncated cone having a cross-sectional area decreasing along (e.g., in proportion to) the protruding depth such that the first and second contact portions C1 and C2 may have radii gradually decreasing along (e.g., in proportion to) the protruding depths and may thus be coupled to the first end portions 11 of the first and second battery cells 10a and 10b when having minimal radii. Since the first and second contact portions C1 and C2 have cross-sectional radii decreasing along (e.g., in proportion to) the protruding depths from the main portion M and are coupled to the center portions of the first end portions 11 of the first and second battery cells 10a and 10b when the first and second contact portions C1 and C2 have minimal radii, the formation of emission or discharge passages may be provided by the gas discharge holes E (refer to FIG. 4) formed around the center portions of the first end portions 11.

In an embodiment, the first and second contact portions C1 and C2 may be thinner than the main portion M. The first and second contact portions C1 and C2 may be welded to the first end portions 11 of the first and second battery cells 10a and 10b, and the first and second contact portions C1 and C2 may have a relatively thin thickness for being sufficiently melted to improve welding strength. In an embodiment, the first and second contact portions C1 and C2 may be formed through a forging process or a press forming process in which portions of a raw-material metal sheet are extended downward, and may thus have a relatively thin thickness because the raw-material metal sheet is extended. For example, as shown in FIG. 4, minimal radius portions of the second contact portions C2 to be welded to the first end portions 11 of the second battery cells 10b may have a second thickness t2 less than a first thickness t1 of the main portion M. The first thickness t1 of the main portion M may be relatively large to decrease resistance to charging and discharging currents. For example, the first thickness t1 may be 1 mm or greater and the second thickness t2 may be 0.4 mm or greater. In an embodiment, the second thickness t2 may have a minimum thickness of 0.4 mm to facilitate bonding to the first end portions 11 of the second battery cells 10b through welding while maintaining shape, and the first thickness t1 may have a minimum thickness of 1 mm to produce the second thickness of 0.4 mm while extending through a forging process or a press forming process. In an embodiment of the present disclosure, the first thickness t1 may be 1 mm and the second thickness t2 may be 0.4 mm.

Referring to FIG. 5, a plurality of first contact portions C1 and a plurality of second contact portions C2 may be arranged on the main portion M in rows. In the embodiment of the present disclosure shown in FIG. 3, the first tab plate 110a may connect a row of first battery cells 10a and an adjacent row of second battery cells 10b to each other in such a manner that the first end portions 11 of the first battery cells 10a having the same polarity may be connected in parallel to each other and the first end portions 11 of the second battery cells 10b having the same polarity may be connected in parallel to each other, while the first end portions 11 of the first and second battery cells 10a and 10b having opposite polarities are connected in series to each other. To connect the battery cells 10a and 10b in series-parallel using the first tab plate 110a as described above, the first tab plate 110a may include a plurality of first contact portions C1 and a plurality of second contact portions C2 to be connected to the first and second battery cells 10a and 10b, and the first and second contact portions C1 and C2 may be arranged in rows according to the first and second battery cells 10a and 10b arranged in rows.

Referring to FIG. 3, a second tab plate 110b for electrically connecting the second end portions 12 of the first and second battery cells 10a and 10b may be placed on the second cover 100b. Like the first tab plate 110a, the second tab plate 110b may include: a main portion M configured to be placed on the second cover 100b; and first and second contact portions C1 and C2 protruding from the main portion M to different depths.

The second tab plate 110b may connect the second end portions 12 of the first battery cells 10a having the same polarity to each other in parallel, the second end portions 12 of the second battery cells 10b having the same polarity to each other in parallel, and the second end portions 12 of the first and second battery cells 10a and 10b having different polarities to each other in series. To this end, a plurality of first contact portions C1 and a plurality of second contact portions C2 for being respectively connected to the first and second battery cells 10a and 10b may be formed on the second tab plate 110b.

Figure 6A:
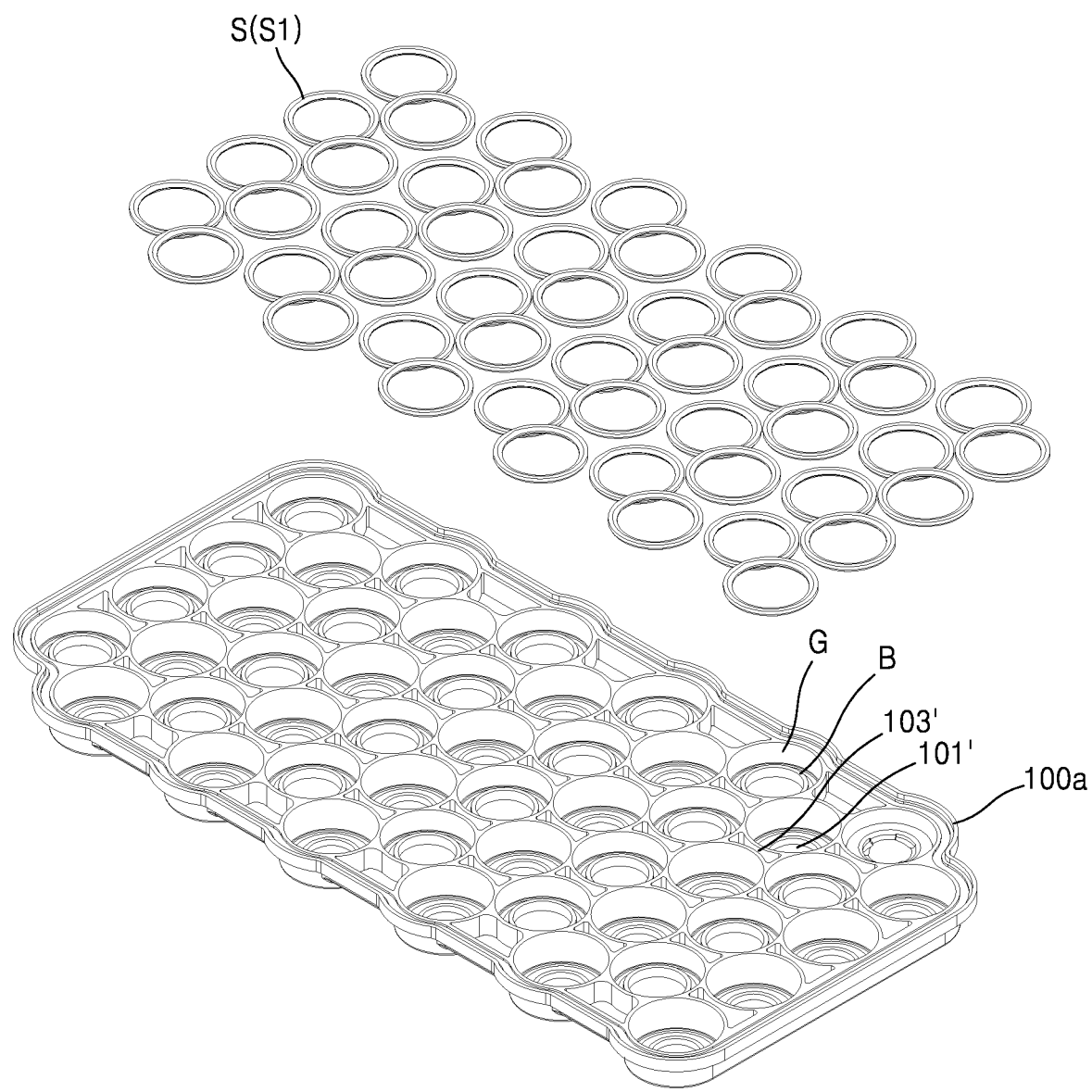
FIGS. 6A and 6B are an exploded perspective view and a plan view, respectively, illustrating a first cover shown in FIG. 1.
Figure 6B:
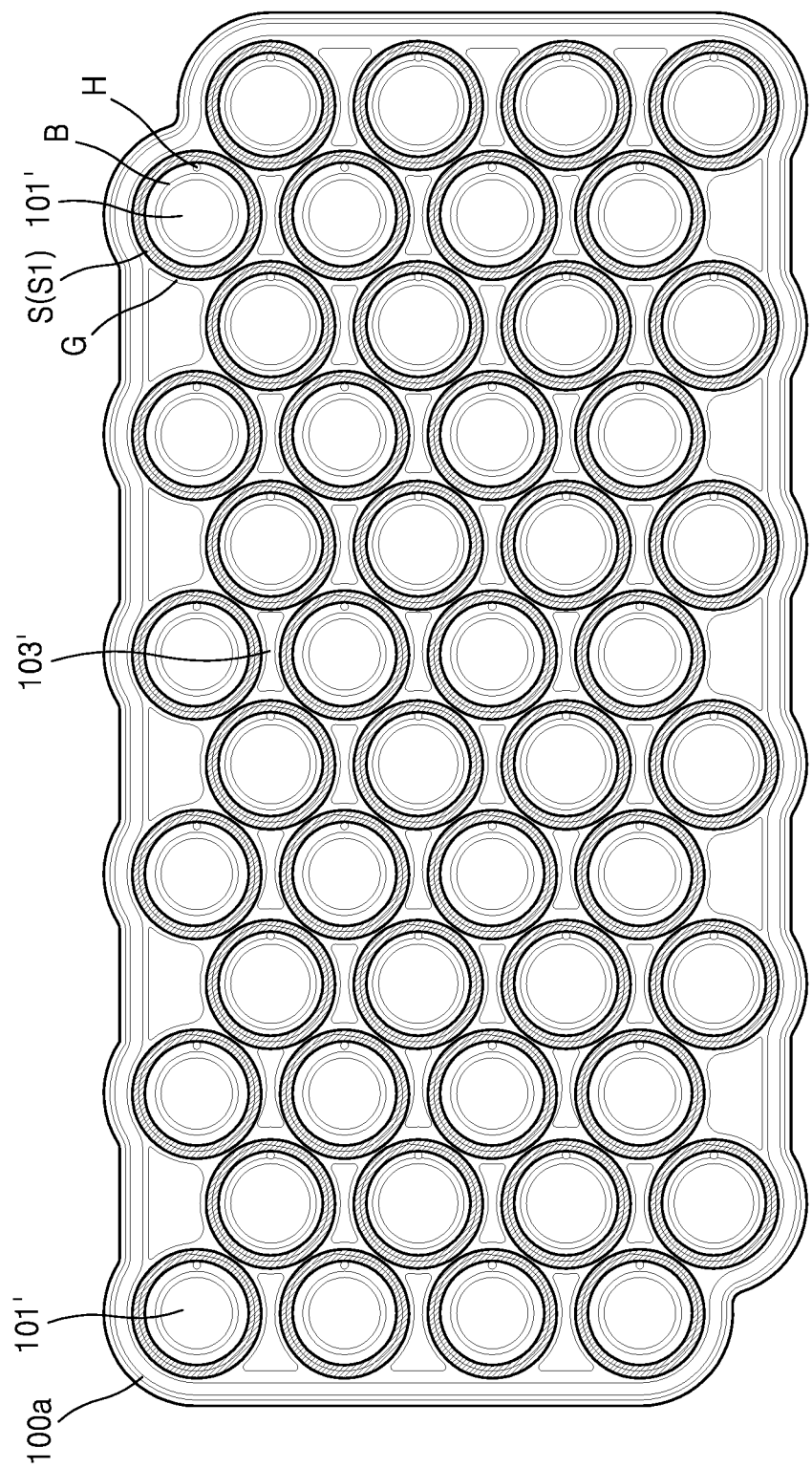

FIGS. 6A and 6B are an exploded perspective view and a plan view, respectively, illustrating the first cover 100a shown in FIG. 1.

Referring to FIGS. 1, 6A, and 6B, the case 100 may hermetically contain a cooling fluid for cooling the battery cells 10, and the accommodation space A filled with the cooling fluid may be sealed to prevent leakage of the cooling fluid from the inside of the accommodation space A.

The first and second terminal holes 101' and 102' may be formed in the first and second covers 100a and 100b of the case 100 to expose the first and second end portions 11 and 12 of the battery cells 10 therethrough, and the battery cells 10 may be electrically connected to each other through the first and second end portions 11 and 12 exposed through the first and second terminal holes 101' and 102'.

The first and second terminal holes 101' and 102' may expose only center portions of the first and second end portions 11 and 12 of the battery cells 10 such that the first and second end portions 11 and 12 of the battery cells 10 may not completely pass through the first and second terminal holes 101' and 102', and peripheral portions of the first and second end portions 11 and 12 may be covered with portions of the first and second covers 100a and 100b formed around the first and second terminal holes 101' and 102'.

Referring to FIGS. 1 and 6B, guide ribs G may be formed on the first and second covers 100a and 100b. The guide ribs G may define assembling positions of the battery cells 10 and may protrude from the first and second covers 100a and 100b toward the first and second end portions 11 and 12 of the battery cells 10 to surround the first and second end portions 11 and 12 of the battery cells 10. The guide ribs G of the first and second covers 100a and 100b may respectively surround the first and second end portions 11 and 12 of the same battery cells 10 to delimit the assembling positions of the battery cells 10, and may thus be formed at positions corresponding to each other.

In an embodiment, the guide ribs G surrounding the peripheries of the first and second end portions 11 and 12 of the battery cells 10 may be formed outside barrier ribs B surrounding the first and second terminal holes 101' and 102', and the barrier ribs B and the guide ribs G that are located at inner sides and outer sides relative to the first and second terminal holes 101' and 102' may extend in parallel to each other in the shape of concentric circles from the first and second covers 100a and 100b toward the first and second end portions 11 and 12 of the battery cells 10. While regulating the assembling positions of the battery cells 10, the guide ribs G may fix sealing members S (refer to FIG. 6B) in position from the outsides of the sealing members S and may thus prevent or substantially prevent movement or wobbling of the sealing members S. Aspects of the barrier ribs B and the sealing members S will be described further later.

In an embodiment, the guide ribs G may have a ring shape to surround the peripheries of the first and second end portions 11 and 12 and may be arranged in rows in such a manner that guide ribs G of a row may be placed in valleys between guide ribs G of an adjacent row. The guide ribs G are formed at positions corresponding to the battery cells 10 that are arranged in such a manner that battery cells 10 of a row are placed in valleys between battery cells 10 of an adjacent row. Therefore, the guide ribs G may also be arranged in a pattern corresponding to the arrangement of the battery cells 10.

In an embodiment, gap portions 103' may be formed between the guide ribs. For example, each of the gap portions 103' may be formed between guide ribs G adjacent to each other and facing each other with a valley therebetween. For example, each of the gap portions 103' may be provided in a surplus space among four neighboring guide ribs G having adjacent peripheries.

The gap portions 103' may absorb tolerance of adjacent guide ribs G, and, as described later, the gap portions 103' may provide coupling positions for fixing the position of a barrier wall 150 (refer to FIG. 9) provided in the case 100. For example, the gap portions 103' of the first and second covers 100a and 100b may be formed at positions corresponding to each other to provide coupling positions to the barrier wall 150 (refer to FIG. 9) provided in the case 100.

In an embodiment, the gap portions 103' may be thinner than the guide ribs G protruding from the first and second covers 100a and 100b to provide coupling positions to the barrier wall 150 (refer to FIG. 9) and prevent or substantially prevent variations in the distance between adjacent guide ribs G caused by contraction of the gap portions 103' when a high-temperature molten resin is cooled to room temperature during an injection molding process.

Referring to FIGS. 6A and 6B, the sealing members S may be arranged on the first cover 100a. For example, the sealing members S may be arranged around the first terminal holes 101' to block cooling fluid leakage passages formed through the first terminal holes 101'. Although not shown in FIGS. 6A and 6B, other sealing members S may be arranged around the second terminal holes 102' to block cooling fluid leakage passages formed through the second terminal holes 102'. In the following description, the sealing members S arranged around the first terminal holes 101' will be mainly described, but the sealing members S arranged around the second terminal holes 102' may have substantially the same technical aspects.

The sealing members S may have a ring shape to continuously surround the first terminal holes 101'. In an embodiment of the present disclosure, a plurality of sealing members S (for example, first sealing members S1) may be individually respectively provided around the first terminal holes 101' to surround the first terminal holes 101', and the sealing members S (for example, first sealing members S1) may be respectively placed inside the guide ribs G surrounding the first end portions 11 of the battery cells 10. In another embodiment of the present disclosure, a plurality of sealing members S (first sealing members S1) may be connected to each other as a single sheet, and, in this case, the sealing members S (first sealing members S1) may be concurrently (e.g., simultaneously) aligned with the first terminal holes 101' through a single position arranging action.

Figure 7:
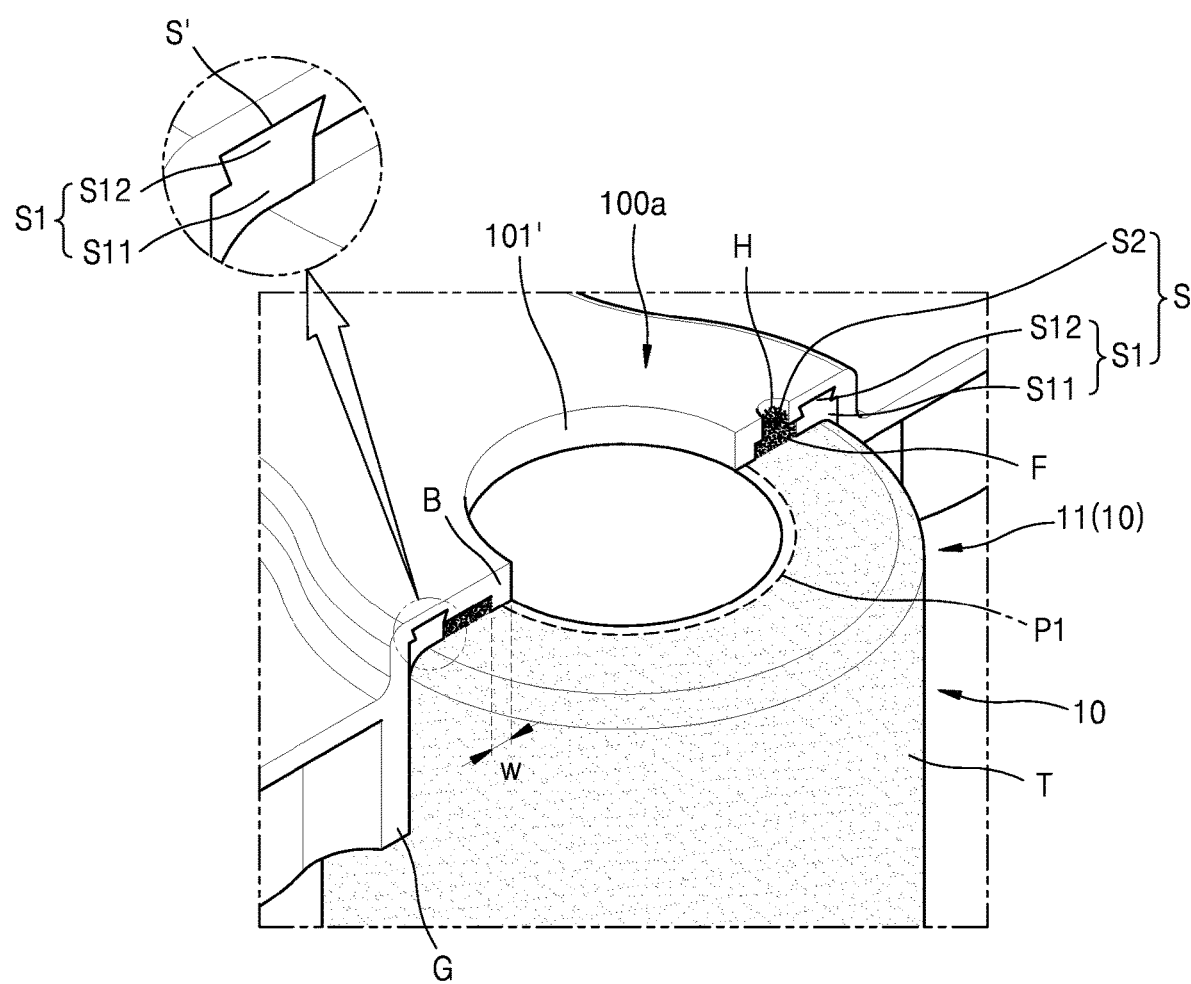
FIG. 7 is a cut-away view taken along the line VII-VII in FIG. 1.

FIG. 7 is a cut-away view taken along the line VII-VII in FIG. 1.

Referring to FIG. 7, in an embodiment, the sealing members S may include first and second sealing members S1 and S2 doubly surrounding the first terminal holes 101' from the outsides of the first terminal holes 101'. The first terminal holes 101' may be sealed by doubly surrounding the first terminal holes 101' with the first and second sealing members S1 and S2, and the first and second sealing members S1 and S2 may doubly block gaps between the first cover 100a and the first end portions 11 of the battery cells 10 from the outsides of the first terminal holes 101'.

The first and second sealing members S1 and S2 may have a ring shape to continuously surround the first terminal holes 101'. For example, the first sealing members S1 may have a ring shape and surround the first terminal holes 101' at relatively outer positions, and the second sealing members S2 may have a ring shape and surround the first terminal holes 101' at relatively inner positions.

In an embodiment, the first sealing members S1 may have a preformed pattern and be formed together with the first cover 100a by an insert molding method. For example, the first sealing members S1 may include an elastic material having high sealing characteristics, and the elastic material may be a rubber material, such as ethylene propylene diene terpolymer (EPDM).

The first sealing members S1 may include protruding portions S11 protruding from the first cover 100a. The first sealing members S1 are for blocking gaps between the first cover 100a and the first end portions 11 of the battery cells 10, and the protruding portions S11 of the first sealing members S1 may protrude from the first cover 100a and make contact with the first end portions 11 of the battery cells 10. For example, the protruding portions S11 may surround the first terminal holes 101' and block cooling fluid leakage passages formed through the first terminal holes 101', and, to this end, the protruding portions S11 may protrude from the first cover 100a and may be elastically brought into contact with the first end portions 11 of the battery cells 10 by pressure.

As described above, portions of the first sealing members S1 may form the protruding portions S11 protruding from the first cover 100a and making contact with the first end portions 11 of the battery cells 10, and the other portions of the first sealing members S1 may form buried portions S12 inserted into coupling groves S' formed in the first cover 100a for fixing the positions of the first sealing members S1. The protruding portions S11 and the buried portions S12 may adjoin each other to form sides and the other sides of the first sealing members S1.

The buried portions S12 and the coupling groves S' of the first cover 100a may have complementary shapes for matching each other and may be coupled to each other like dovetails to prevent separation. For example, the buried portions S12 may have a width gradually increasing in a recessed direction of the coupling grooves S', and the widths of the buried portions S12 increasing in the recessed direction S' may function as stop jaws preventing separation from the coupling grooves S'.

In an embodiment, the buried portions S12 may be formed by an insert molding method in a state in which the buried portions S12 are inserted in the coupling grooves S' of the first cover 100a. For example, after the first sealing members S1 including the buried portions S12 having a dovetail shape are fixed to the inside of a mold (not shown) in which a molten resin may be injected for forming the first cover 100a, the molten resin may be injected into the mold to form the first cover 100a having the coupling grooves S' matching the dovetail-shaped buried portions S12. Then, the buried portions S12 may be formed in a state in which the buried portions S12 are buried in the coupling grooves S' of the first cover 100a.

The first and second sealing members S1 and S2 may surround the first terminal holes 101' from the outsides of the first terminal holes 101' at different positions. That is, the first sealing members S1 may be around the outsides of the first terminal holes 101', and the second sealing members S2 may be placed between the first terminal holes 101' and the first sealing members S1 in a radius direction of the first terminal holes 101'.

In the present disclosure, the radius direction of the first terminal holes 101' does not necessarily mean that the first terminal holes 101' have a circular shape. For example, the first terminal holes 101' may have any shape, such a circular shape or an elliptical shape, and the radius direction of the first terminal holes 101' may refer to a direction from the center of a first terminal hole 101' toward the outside of the first terminal hole 101'.

In an embodiment, the second sealing members S2 may be filled between the first terminal holes 101' and the first sealing members S1 and may include a material having fluidity variable by heating. For example, the second sealing members S2 may be liquid or gel similar to liquid and may have sufficient fluidity for permeating into filling spaces F between the first terminal holes 101' and the first sealing members S1. As the second sealing members S2 cool to room temperature, the second sealing members S2 may solidify. In an embodiment, the second sealing members S2 may include a material having fluidity variable by heat, pressure, or light having a particular wavelength band. That is, the fluidity of the material of the second sealing members S2 may be varied by various fluidity adjusting factors such as heating, pressurizing, or irradiation with light.

The barrier ribs B may be formed along the outsides of the first terminal holes 101' to prevent permeation of the second sealing members S2 having fluidity. For example, the barrier ribs B may protrude from the first cover 100a toward the first end portions 11 of the battery cells 10 to define the filling spaces F for the second sealing members S2 while preventing the second sealing members S2 having fluidity from permeating into the first terminal holes 101' through gaps between the first cover 100a and the first end portions 11 of the battery cells 10. The barrier ribs B may be formed around the outsides of the first terminal holes 101'. For example, the barrier ribs B may surround the first terminal holes 101' and define the first terminal holes 101'.

While defining the filling spaces F for the second sealing members S2 from the outsides of the first terminal holes 101', the barrier ribs B may block cooling fluid leakage passages formed through the first terminal holes 101' together with the first and second sealing members S1 and S2. That is, since the barrier ribs B provide additional sealing portions surrounding the first terminal holes 101' in addition to the first and second sealing members S1 and S2, a triple sealing structure may be provided to the peripheries of the first terminal holes 101'.

The filling spaces F for the second sealing members S2 may be defined between the barrier ribs B and the first sealing members S1 in the radius direction of the first terminal holes 101' and between the first cover 100a and the first end portions 11 of the battery cells 10 in a direction penetrating the first terminal holes 101'. For example, the filling spaces F for the second sealing members S2 may be formed in a doughnut shape around the peripheries of the first terminal holes 101'.

In an embodiment, injection holes H connected to the filling spaces F may be formed in the first cover 100a. For example, the injection holes H may be formed at positions between the barrier ribs B and the first sealing members S1 that form the filling spaces F. The second sealing members S2 may be injected into the filling spaces F through the injection holes H to fill the filling spaces F and then the injection holes H. For example, the second sealing members S2 pressurized to a given pressure may be injected into the filling spaces F through the injection holes H to substantially fill the entire volume of the filling spaces F.

The first and second sealing members S1 and S2 may provide a double sealing structure at positions adjacent to each other in the radius direction of the first terminal holes 101'. However, the scope of the present disclosure is not limited thereto. For example, the sealing structure of the present disclosure may include multiple sealing portions having non-continuous boundaries in the radius direction of the first terminal holes 101' and arranged adjacent to each other. Therefore, leakage of the cooling fluid through the first terminal holes 101' may be reliably prevented by the multiple sealing structure which provide at least double sealing.

In the embodiment shown in FIG. 7, unlike the first sealing members S1, the second sealing members S2 may be liquid or of any form similar to liquid and injected through the injection holes H formed in the first cover 100a. However, the scope of the present disclosure is not limited thereto. For example, instead of filling the second sealing members S2 through the injection holes H, the second sealing members S2 may be formed in a preformed pattern and injection molded together with the first cover 100a, or may be formed separately from the first cover 100a and may then be inserted into the first cover 100a.

The first and second sealing members S1 and S2 may be arranged around the outsides of the first terminal holes 101', and, although not shown in the drawings, other first and second sealing members S1 and S2 may also be arranged around the outsides of the second terminal holes 102'. The first and second sealing members S1 and S2 around the second terminal holes 102' may doubly block gaps between the second cover 100b and the second end portions 12 of the battery cells 10 from the outsides of the second terminal holes 102'. That is, the first sealing members S1 may have a ring shape along the outsides of the second terminal holes 102', and the second sealing members S2 may be filled in filling spaces F defined by the barrier ribs B surrounding the second terminal holes 102' and the first sealing members S1 provided outside the barrier ribs B. In an embodiment, the technical characteristics of the first and second sealing members S1 and S2 are substantially the same as those described above, and, thus, descriptions thereof will not be repeated here.

Figure 8A:
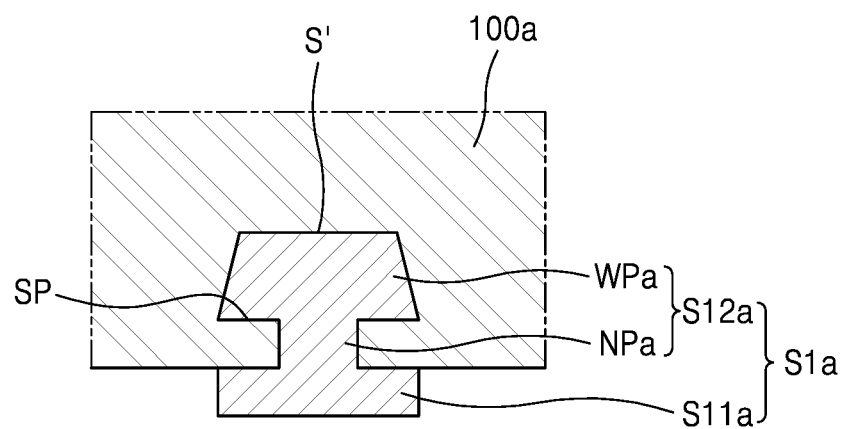
FIGS. 8A and 8B are cross-sectional views illustrating modifications of a first sealing member shown in FIG. 7.
Figure 8B:
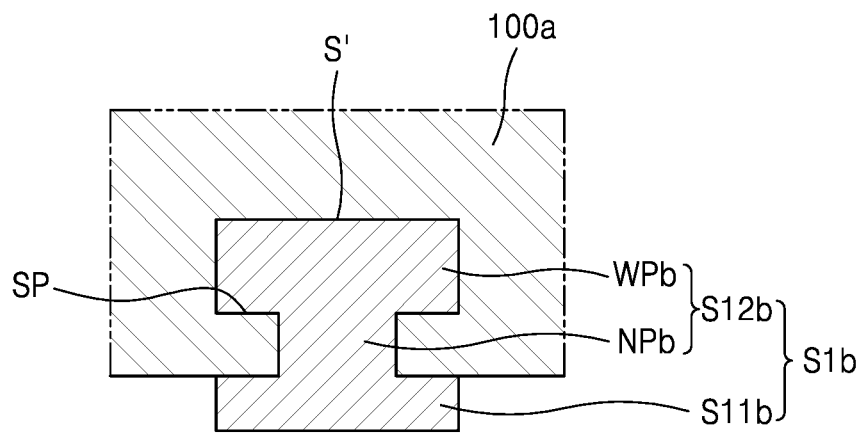

FIGS. 8A and 8B are cross-sectional views illustrating modifications of the first sealing member S1 shown in FIG. 7.

Referring to FIGS. 8A and 8B, first sealing members S1a and S1b may include: portions S12a and S12b buried in the first cover 100a; and protruding portions S11a and S11b extending from the buried portions S12a and S12b and protruding from the first cover 100a. The buried portions S12a and S12b may have a shape complementary to the shape of the coupling grooves S' of the first cover 100a, and at least portions of the buried portions S12a and S12b may be wider than stop jaws SP of the coupling grooves S' such that the buried portions S12a and S12b may not be separated owing to the stop jaws SP.

For example, the buried portions S12a and S12b may include: narrow-width portions NPa and NPb forming bottle-neck portions of the first sealing members S1a and S1b corresponding to the stop jaws SP of the coupling grooves S'; and wide-width portions WPa and WPb wider than the narrow-width portions NPa and NPb. In this case, as shown in FIGS. 8A and 8B, the wide-width portions WPa and WPb may have any of various shapes, such as a trapezoidal cross-sectional shape or a rectangular cross-sectional shape, as long as the wide-width portions WPa and WPb are wider than a width between the stop jaws SP for preventing separation from the stop jaws SP. The protruding portions S11a and S11b may protrude from the first cover 100a and make contact with the first end portions 11 of the battery cells 10. The protruding portions S11a and S11b may be wider than the narrow-width portions NPa and NPb of the buried portions S12a and S12b for forming a large contact area with the first end portions 11 of the battery cells 10.

The first sealing members S1a and S1b shown in FIGS. 8A and 8B may be formed by an injection molding method like the first sealing member S1 shown in FIG. 7, or may be formed separately from the first cover 100a and may then be inserted into the coupling grooves S' of the first cover 100a.

The case 100 may accommodate the battery cells 10 and the cooling fluid for cooling the battery cells 10. Here, the cooling fluid may refer to a liquid cooling medium having higher thermal capacity and heat-dissipating performance than a gas cooling medium, such as air. In an embodiment, the cooling fluid may flow in the accommodation space A (refer to FIG. 1) while directly making contact with the battery cells 10, thereby dissipating heat from the surfaces of the battery cells 10. For example, the accommodation space A (refer to FIG. 1) of the case 100 may accommodate the cooling fluid directly making contact with the battery cells 10, and convective heat transfer may occur by the flow of the cooling fluid in the accommodation space A (refer to FIG. 1) such that heat may be directly transferred from the battery cells 10.

In an embodiment of the present disclosure, the battery cells 10 may be large battery cells having high output power and high capacity to provide high electrical output power, and, thus, a relatively large amount of heat may be generated during charging and discharging operations of the battery cells 10. Thus, according to the present disclosure, a flow of the cooling fluid directly making contact with the battery cells 10 is induced to dissipate heat from the battery cells 10, and since the cooling fluid having higher heat capacity than a gas cooling medium, such as air, is used, heat generated during operations of the battery cells 10 may be smoothly dissipated.

In an embodiment of the present disclosure, the battery cells 10 may have a cylindrical shape with a diameter of about 21 mm or greater and a length of about 700 mm or greater. For example, heat dissipation through direct contact with the cooling fluid may be effective in smoothly dissipating heat from cylindrical battery cells having a diameter of about 30 mm or greater and a length of about 1000 mm or greater, and, thus, a high-power, high-capacity battery pack may be provided by increasing the size of battery cells 10 to increase the output power of the battery cells 10. However, the scope of the present disclosure is not limited to relatively large battery cells. The inventive concept of the present disclosure may be applied by considering electrical output power characteristics in applications. For example, the inventive concept may be applied to applications requiring momentarily high output power, applications involving generation of a large amount of heat depending on situations such as battery cells having relatively high internal resistance, or applications involving battery cells in which a large amount of heat is characteristically generated.

The cooling fluid may include an electrically insulative fluid or an electrically conductive fluid, and, in an embodiment, as shown in FIG. 7, insulative layers T may be provided on the outsides of the battery cells 10 that directly make contact with the cooling fluid. For example, the surfaces of the battery cells 10 may have the same polarity as the first end portions 11 or the second end portions 12 of the battery cells 10, and the insulative layers T may be formed on the surfaces of the battery cells 10 to prevent or substantially prevent electrical interference between the battery cells 10 occurring due to the flow of the cooling fluid that transfers heat while directly making contact with the battery cells 10.

As shown in FIG. 7, the insulative layers T of the battery cells 10 may be formed in such a manner that the center portions of the first end portions 11 at which electrical connection of the battery cells 10 occurs may be exposed to the outside. For example, the insulative layers T may be formed on the entirety of the battery cells 10 except the center portions of the first end portions 11 of the battery cells 10 where electrical connection is made and the center portions of the second end portions 12 of the battery cells 10 where electrical connection is made. That is, in an embodiment, the insulative layers T may entirely surround lateral surfaces of the battery cells 10 and may end at the first and second end portions 11 and 12 of the battery cells 10. That is, end positions P1 of the insulative layers T may be on the first and second end portions 11 and 12, and the center portions of the first and second end portions 11 and 12 beyond the end positions P1 of the insulative layers T may be not covered with the insulative layers T, but may be exposed for electrical connection.

In the following description, the end positions P1 formed on the first end portions 11 of the first and second end portions 11 and 12 of the battery cells 10 will be mainly described. However, the following description may also be applied to the end positions P1 of the insulative layers T formed on the second end portions 12 of the battery cells 10.

Referring to FIG. 7, the end positions P1 of the insulative layers T may be between the first terminal holes 101' and the second sealing members S2 in the radius direction of the first terminal holes 101' That is, maximally, the insulative layers T may be formed up to the first terminal holes 101', and minimally, the insulative layers T may be formed up to the second sealing members S2.

If the insulative layers T extend to the insides of the first terminal holes 101' and cover the center portions of the first end portions 11 of the battery cells 10, the insulative layers T may interfere in electrical connection of the battery cells 10, and if the insulative layers T are not formed up to positions where the permeation of the cooling fluid is doubly blocked by the first and second sealing members S1 and S2, a leak of the cooling fluid may directly make contact with the battery cells 10 to result in electrical inference.

The end positions P1 of the insulative layers T may be between the first terminal holes 101' and the second sealing members S2. In an embodiment of the present disclosure, the end positions P1 of the insulative layers T may be located within a thickness (w) of the barrier ribs B corresponding to regions between the first terminal holes 101' and the second sealing members S2. For example, since the barrier ribs B have inner sides surrounding the first terminal holes 101' and outer sides making contact with the second sealing members S2, the end positions P1 of the insulative layers T may be within the thickness (w) of the barrier ribs B between the inner and outer sides of the barrier ribs B.

Figure 9:
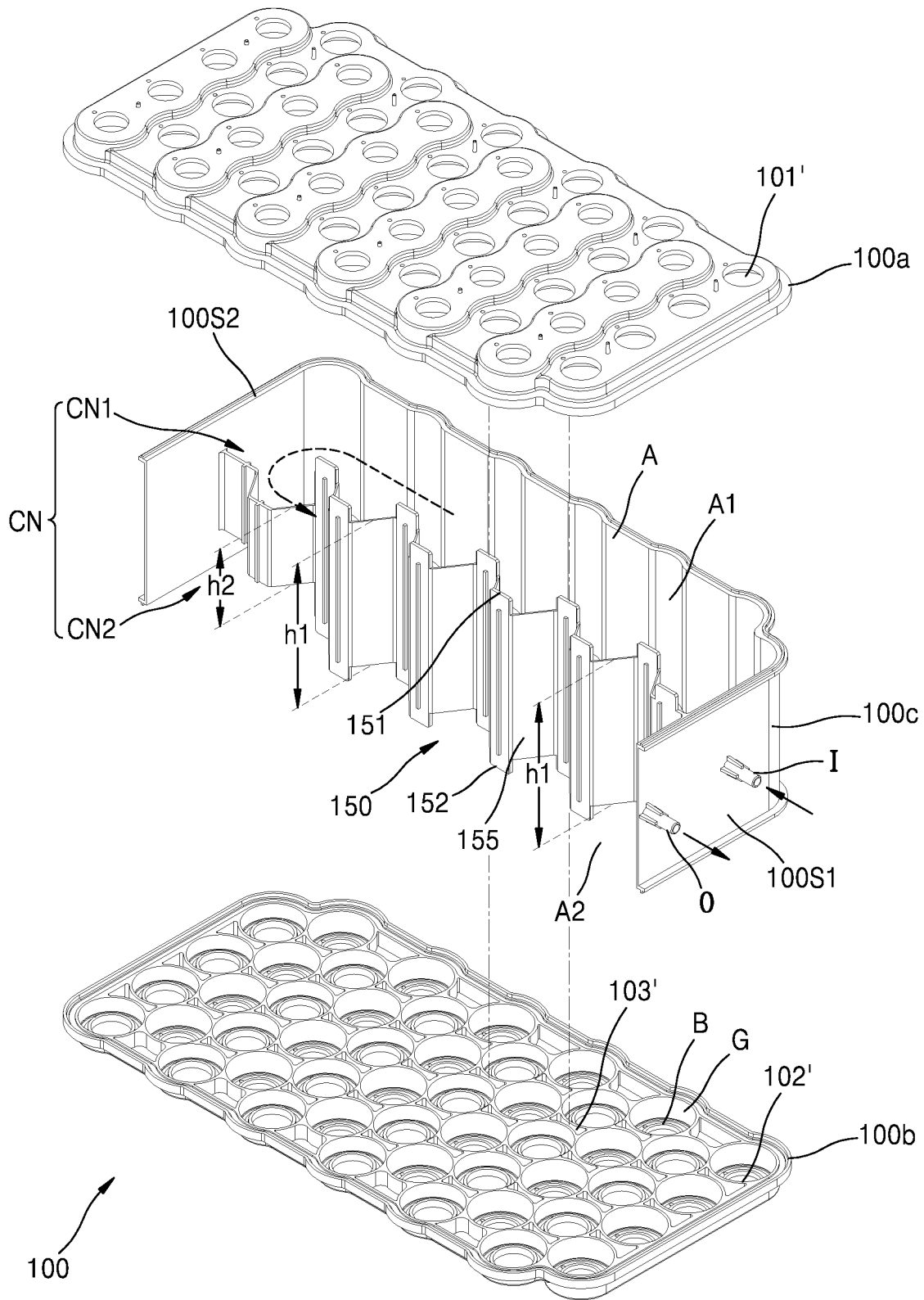
FIG. 9 is an exploded perspective view illustrating a case shown in FIG. 1.
Figure 10:
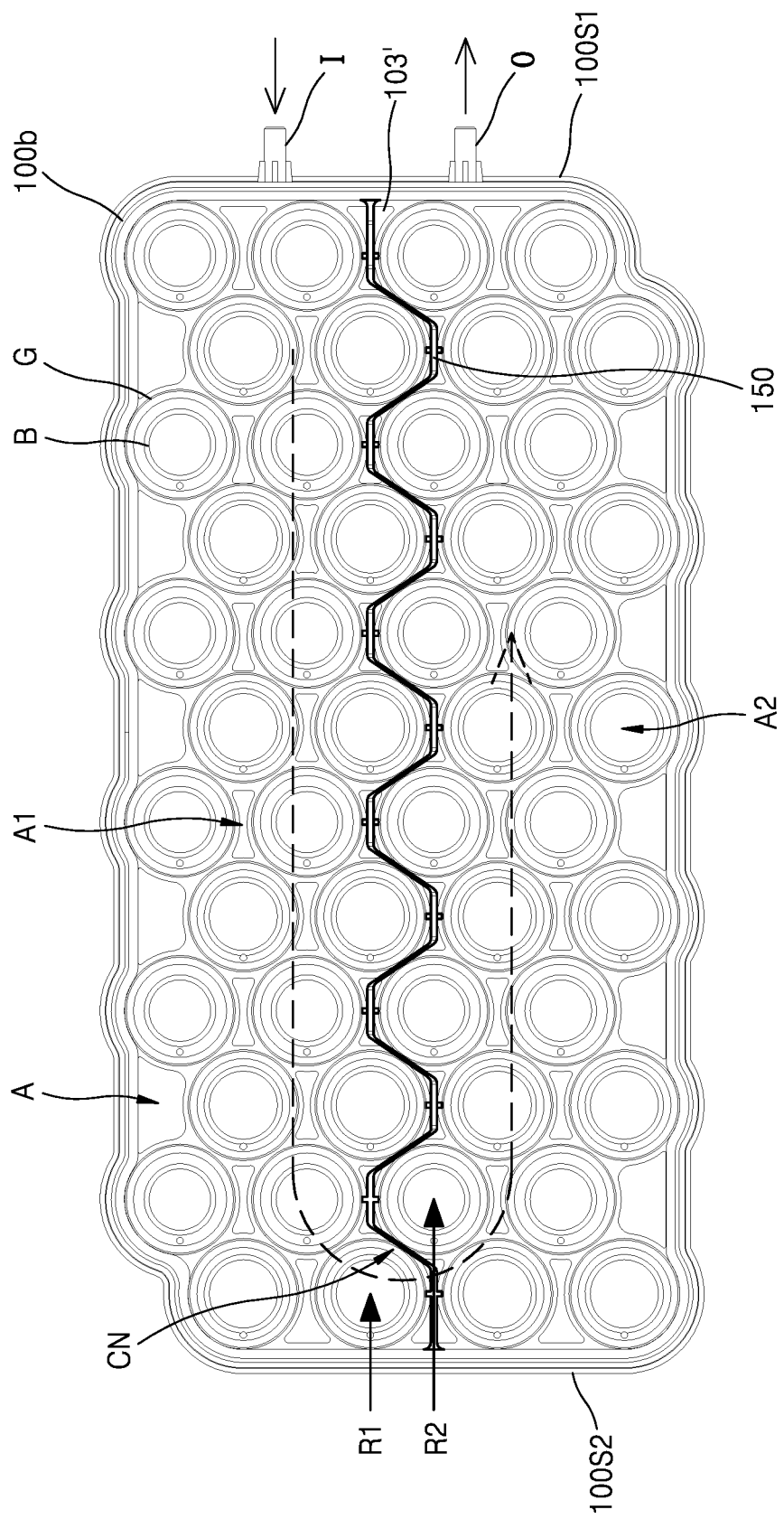
FIG. 10 is a view illustrating a flow of a cooling fluid in the case shown in FIG. 9.

FIG. 9 is an exploded perspective view illustrating the case 100 shown in FIG. 1; and FIG. 10 is a view illustrating a flow of the cooling fluid in the case 100 shown in FIG. 9.

Referring to FIGS. 9 and 10, the case 100 may accommodate the battery cells 10 and the cooling fluid for cooling the battery cells 10. In an embodiment, the case 100 may include a middle case 100c and the first and second covers 100a and 100b facing each other with the middle case 100c therebetween. The case 100 may be formed in a shape divided into three parts, that is, the middle case 100c and the first and second covers 100a and 100b, and may provide the accommodation space A sealed by coupling the middle case 100c and the first and second covers 100a and 100b to each other. In an embodiment, the middle case 100c and the first and second covers 100a and 100b may be coupled to each other by a laser welding method. Thus, a first laser weld zone L1 (refer to FIG. 3) may be formed along boundaries of the middle case 100c and the first cover 100a, and a second laser weld zone L2 (refer to FIG. 3) may be formed along boundaries of the middle case 100c and the second cover 100b. In an embodiment, since the case 100 is formed in a shape divided into three parts: the middle case 100c and the first and second covers 100a and 100b, laser welding may be performed on close positions of the upper and lower portions of the battery pack while adjusting the welding positions in such a manner that the welding positions may be easily exposed to a laser beam emitted in an oblique direction toward the upper and lower portions of the battery pack. Thus, welding may be easily performed.

In an embodiment, the middle case 100c and the first and second covers 100a and 100b may be formed by an injection molding method and may include an engineering plastic material for injection molding and laser welding. For example, the middle case 100c and the first and second covers 100a and 100b may include a polyamide-based material including glass fiber. For example, as optical conditions for performing a laser welding process on a stack of two base materials, a base material which is relatively close in a laser beam emission direction is required to have transmittance to laser beams within a range of a certain value or greater, and the other base material which is relatively distant in the laser beam emission direction is required to have laser beam absorptivity within a range of a certain value or greater. In an embodiment, the middle case 100c and the first and second covers 100a and 100b may include a polyamide-based material including glass fiber that satisfies the optical conditions.

In an embodiment, the first and second covers 100a and 100b may cover the first and second end portions 11 and 12 of the battery cells 10, and the middle case 100c may cover most of the length of the battery cells 10. That is, the middle case 100c may be longer than the first and second covers 100a and 100b in the length direction of the battery cells 10. The middle case 100c may define the accommodation space A while surrounding the peripheries of the battery cells 10 and, in an embodiment, may be formed in one piece with the barrier wall 150 provided inside the accommodation space A. In an embodiment, the middle case 100c and the barrier wall 150 may be formed in one piece by an injection molding method.

The case 100 may accommodate a flow of the cooling fluid for cooling the battery cells 10, and the barrier wall 150 may be provided in the case 100 across the accommodation space A to divide the accommodation space A into an upstream area A1 and a downstream area A2. The upstream area A1 may be connected to an inlet I of the cooling fluid such that the cooling fluid may be introduced into the upstream area A1 at a relatively low temperature, and the downstream area A2 may be connected to an outlet O of the cooling fluid such that the cooling fluid may be discharged from the downstream area A2 at a relatively high temperature. The inlet I and the outlet O of the cooling fluid may be formed in a side in an extension direction of the barrier wall 150, and a communication area CN connecting the upstream area A1 and the downstream area A2 to each other may be formed at the other side in the extension direction of the barrier wall 150. The communication area CN may connect the upstream area A1 and the downstream area A2 to each other such that a flow of the cooling fluid from the inlet I to the other side in the upstream area A1 may be reversed like a U-turn to form a flow of the cooling fluid from the other side toward the outlet O in the downstream area A2.

The inlet I and the outlet O may be formed in an end in the extension direction of the barrier wall 150. For example, both the inlet I and the outlet O may be formed in a first short-side portion 100S1 of the case 100. As described above, in an embodiment, the inlet I and the outlet O are formed together in the first short-side portion 100S1, for example, instead of being formed respectively in first and second short-side portions 100S1 and 100S2. Therefore, fluid connection in the case 100 may be easily made. For example, the case 100 may include: a pair of long-side portions parallel to the extension direction of the barrier wall 150; and the first and second short-side portions 100S1 and 100S2 connecting the pair of long-side portions, and the inlet I and the outlet O may be formed in the first short-side portion 100S1. That is, the inlet I and the outlet O may not be formed in the second short-side portion 100S2 opposite the first short-side portion 100S1.

In the present disclosure, the inlet I and the outlet O are formed in the first short-side portion 100S1, and the flow of the cooling fluid is reversed like a U-turn at a side of the second short-side portion 100S2 to connect the flow of the cooling fluid from the inlet I to the outlet O using the barrier wall 150. Therefore, relatively large resistance may be applied to the flow of the cooling fluid, and, thus, the flow of the cooling fluid may be adjusted such that the inside (the accommodation space A) of the case 100 may be fully or almost fully filled with the cooling fluid. Unlike this, if sufficient resistance is not applied to the flow of the cooling fluid, for example, if the cooling fluid flows in one direction from the first short-side portion 100S1 to the second short-side portion 100S2 of the case 100, the cooling fluid may flow without filling a remote portion such as an upper or corner portion of the case 100 to cause insufficient cooling.

According to an embodiment of the present disclosure, the accommodation space A for the battery cells 10 is divided into two parts: the upstream area A1 connected to the inlet I of the cooling fluid, and the downstream area A2 connected to the outlet O of the cooling fluid. Therefore, a cross-sectional area (an area from which heat is to be dissipated) through which the cooling fluid flows may be about one half of the cross-sectional area of the accommodation space A, and, thus, the heat-dissipating performance of the cooling fluid may be improved. Unlike this, if the cooling fluid flows in one direction from the first short-side portion 100S1 to the second short-side portion 100S2 of the case 100, the cross-sectional area (the area from which heat is to be dissipated) through which the cooling fluid flows may be equal to the cross-sectional area of the accommodation space A. Thus, to reduce, by half, the cross-sectional area (the area from which heat is to be dissipated) through which the cooling fluid flows, the pair of the inlet I and the outlet O may be provided to each of the first and second short-side portions 100S1 and 100S2. This may complicate a cooling fluid connection structure and increase the possibility of leakage of the cooling fluid.

In various embodiments of the present disclosure, inlets I and outlets O may be distributed to the first and second short-side portions 100S1 and 100S2 in different numbers. For example, two or more inlets I and two or more outlets O may be distributed to the first and second short-side portions 100S1 and 100S2. For example, two or more barrier walls 150 may be provided, and an inlet I and an outlet O may be provided in each of regions divided by the two or more barrier walls 150. That is, two or more inlets I and two or more outlets O may be formed, and, in this case, the number of the inlets I and the number of the outlets may be different. However, in an embodiment, as shown in FIG. 9, the inlet I and the outlet O are formed in the first short-side portion 100S1. That is, one inlet I and one outlet O are provided as a pair. In this case, as described above, fluid connection in the case 100 may be easily made, and insufficient cooling may be prevented in a remote region of the case 100, such as an upper or corner region. In addition, the cross-sectional area (the area from which heat is to be dissipated) through which the cooling fluid flows may be reduced, and thus the heat-dissipating performance of the cooling fluid may be improved.

Referring to FIG. 10, in an embodiment, the guide ribs G (or the battery cells 10) may be arranged in rows in the extension direction of the barrier wall 150, and in the case 100, the barrier wall 150 may extend across a gap between first and second rows R1 and R2 neighboring each other to divide the rows of the guide ribs G (or the battery cells 10) into two equal groups.

In an embodiment of the present disclosure, the guide ribs G (or the battery cells 10) may be arranged in eight rows in the extension direction of the barrier wall 150, and, in this case, the barrier wall 150 may divide the eight rows into two equal groups each including four rows to form the upstream area A1 and the downstream area A2. In this manner, the number of battery cells 10 included in the upstream area A1 is adjusted to be approximately equal to the number of battery cells 10 included in the downstream area A2 such that the heat-dissipating burden on the cooling fluid may be equally distributed in the upstream area A1 and the downstream area A2.

The barrier wall 150 may extend across the gap between the first and second rows R1 and R2 that are adjacent to each other in a state in which the guide ribs G (or the battery cells 10) of the first row R1 are inserted between the guide ribs G (or the battery cells 10) of the second row R2, and, thus, the barrier wall 150 may extend while meandering across the gap between the first and second rows R1 and R2. For example, the barrier wall 150 may extend in a zigzag pattern along outer surfaces of the guide ribs G (or the battery cells 10) of the first and second rows R1 and R2, and, thus, the barrier wall 150 may include a plurality of bent portions.

Referring to FIG. 9, the barrier wall 150 may include: a main portion 155 extending across the accommodation space A; and first and second coupling portions 151 and 152 arranged from one end to the other end of the barrier wall 150 in the extension direction of the main portion 155 and protruding toward the first and second covers 100a and 100b at intermittent positions. The first and second coupling portions 151 and 152 may be coupled to the gap portions 103' of the first and second covers 100a and 100b.

In an embodiment, the second coupling portions 152 may protrude from the main portion 155 of the barrier wall 150 and make contact with the gap portions 103' of the second cover 100b, and the second coupling portions 152 and the gap portions 103' of the second cover 100b making contact with each other may be welded to each other by a laser welding method. Thus, weld zones may be formed on the gap portions 103' of the second cover 100b as a result of welding of the second coupling portions 152. Similarly, the first coupling portions 151 may protrude from the main portion 155 of the barrier wall 150 and make contact with the gap portions 103' of the first cover 100a, and the first coupling portions 151 and the gap portions 103' of the first cover 100a making contact with each other may be welded to each other by a laser welding method. Thus, weld zones may be formed on the gap portions 103' of the first cover 100a as a result of welding of the first coupling portions 151. The first and second coupling portions 151 and 152 may be arranged at positions corresponding to each other in the extension direction of the barrier wall 150 and may be coupled to the gap portions 103' of the first and second covers 100a and 100b corresponding to the first and second coupling portions 151 and 152.

In an embodiment, the barrier wall 150 may be formed in one piece with the middle case 100c. For example, the barrier wall 150 and the middle case 100c may be formed together by an injection molding method. In this case, the first and second coupling portions 151 and 152 may protrude from the middle case 100c and may be coupled respectively to the gap portions 103' of the first and second covers 100a and 100b.

The main portion 155 of the barrier wall 150 may have different first and second heights h1 and h2 along the extension direction of the barrier wall 150. In an embodiment, the main portion 155 of the barrier wall 150 may have the first height h1 along most of the length of the main portion 155 from the end (the first short-side portion 100S1) in which the inlet I and the outlet O are formed, and may define the upstream area A1 and the downstream area A2 between the first and second covers 100a and 100b. To form the communication area CN connecting the upstream area A1 and the downstream area A2 to each other at the other end (the second short-side portion 100S2) opposite the end in which the inlet I and the outlet O are formed, the main portion 155 of the barrier wall 150 may have the second height h2 at the other end (the second short-side portion 100S2) which is less than the first height h1 at the end (the first short-side portion 100S1). Thus, the communication area CN corresponding to the difference between the first and second heights h1 and h2 may be formed. That is, the main portion 155 of the barrier wall 150 may be stepped from the first height h1 at the end to the second height h2 at the other end, and the communication area CN may correspond to the difference between the first and second heights h1 and h2.

As the ratio of the second height h2 to the first height h1 increases, the difference between the first and second heights h1 and h2 decreases, and the size of the communication area CN decreases, thereby increasing resistance to the flow of the cooling fluid and decreasing the velocity of the flow of the cooling fluid. However, the mechanical rigidity of the barrier wall 150 increases. Conversely, as the ratio of the second height h2 to the first height h1 decreases, the difference between the first and second heights h1 and h2 increases, and the size of the communication area CN increases, thereby decreasing resistance to the flow of the cooling fluid and increasing the velocity of the flow of the cooling fluid. However, the mechanical rigidity of the barrier wall 150 decreases. In the present disclosure, the ratio of the second height h2 to the first height h1 may be determined to firmly maintain the shape of the barrier wall 150 and impart sufficient rigidity to the barrier wall 150 while considering driving power according to resistance to the flow of the cooling fluid.

In an embodiment, in the main portion 155, a section having the second height h2 may be at a middle position of a section having the first height h1 in the height direction of the barrier wall 150, and, thus, an upper stepped section and a lower stepped section may be formed between the section having the second height h2 and the section having the first height h1. In this case, the communication area CN may include a first communication area CN1 corresponding to the upper stepped section close to the first cover 100a, and a second communication area CN2 corresponding to the lower stepped section close to the second cover 100b. In this case, the cooling fluid may smoothly flow between the upstream area A1 and the downstream area A2 through the first and second communication areas CN1 and CN2 that are formed at opposite positions in the height direction of the barrier wall 150. For example, the first communication area CN1 may form a flow of the cooling fluid making contact with sides of the first end portions 11 of the battery cells 10, and the second communication area CN2 may form a flow of the cooling fluid making contact with sides of the second end portions 12 of the battery cells 10. That is, the first and second communication areas CN1 and CN2 may induce a flow of the cooling fluid along the first and second end portions 11 and 12 which relatively intensively generate heat.

In an embodiment of the present disclosure, the communication area CN may be provided as openings corresponding to the difference between the first and second heights h1 and h2 of the main portion 155 of the barrier wall 150. In another embodiment of the present disclosure, the communication area CN may be provided as hole-shaped openings formed in the main portion 155 of the barrier wall 150 such that the cooling fluid may make a U-turn while continuously flowing in the upstream area A1 and the downstream area A2.

In an embodiment of the present disclosure, the communication area CN may be formed in the main portion 155 of the barrier wall 150. The main portion 155 of the barrier wall 150 may guide the flow of the cooling fluid while extending across the accommodation space A, and, thus, the communication area CN for reversing the flow of the cooling fluid may be formed in the main portion 155. In another embodiment of the present disclosure, the barrier wall 150 may not include the first and second coupling portions 151 and 152 to be coupled to the first and second covers 100a and 100b. In this case, since the main portion 155 is not distinguished from the first and second coupling portions 151 and 152, it may be considered that the communication area CN is formed in the barrier wall 150.

Figure 11:
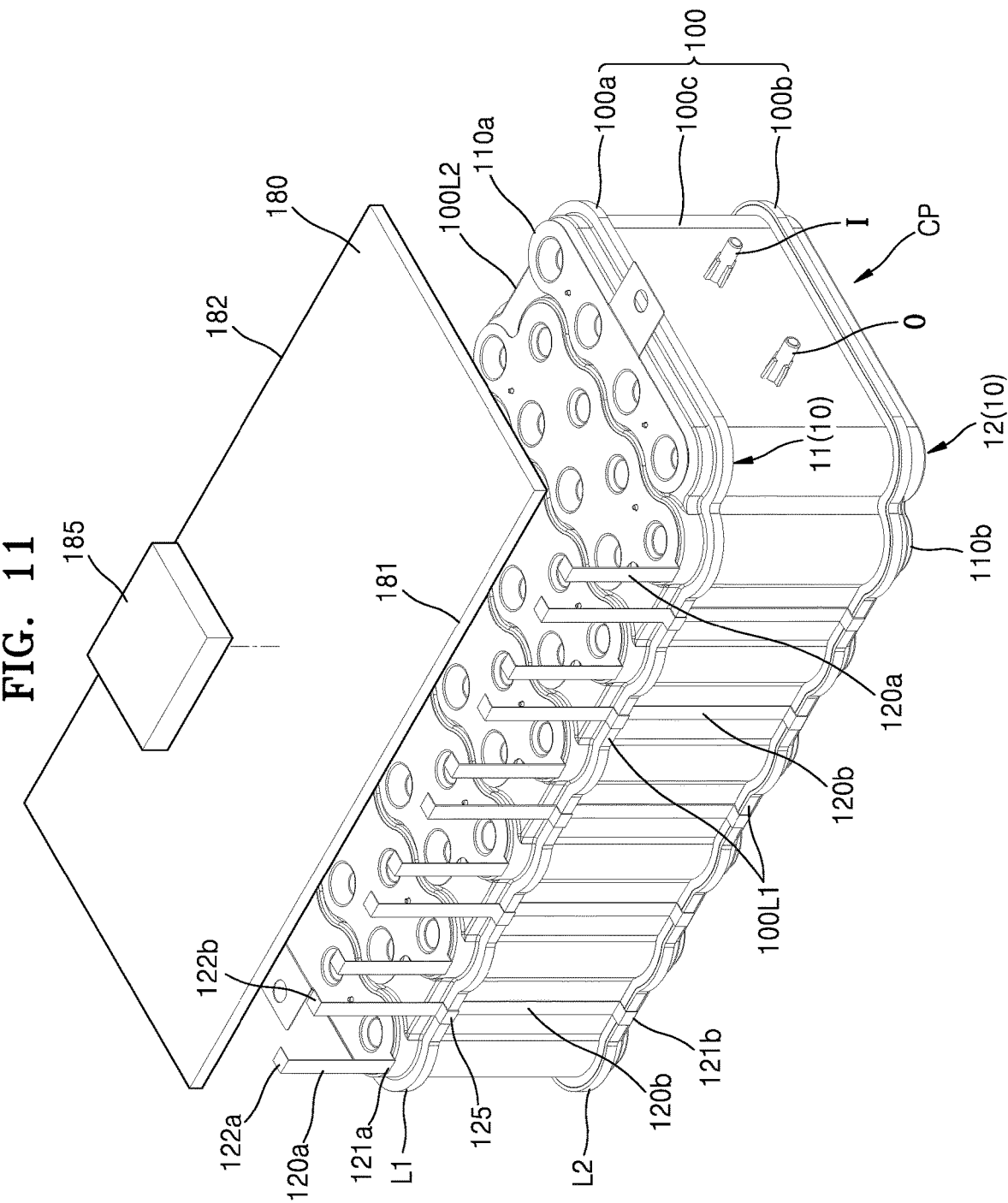
FIG. 11 is a view illustrating connection structures of first and second tab plates shown in FIG. 3.

FIG. 11 is a view illustrating connection structures of the first and second tab plates 110a and 110b shown in FIG. 3.

Referring to FIG. 11, the first tab plate 110a may be placed on the first cover 100a to electrically connect the first end portions 11 of the battery cells 10, and the second tab plate 110b may be placed on the second cover 100b to electrically connect the second end portions 12 of the battery cells 10. A circuit board 180 may be placed on the first tab plate 110a, and the first and second tab plates 110a and 110b may be connected to the circuit board 180. To this end, a first lead 120a may be provided between the circuit board 180 and the first tab plate 110a for electrical connection therebetween, and a second lead 120b may be provided between the circuit board 180 and the second tab plate 110b for electrical connection therebetween. State information about the battery cells 10 transmitted through the first and second tab plates 110a and 110b, such as voltage information, may be transmitted to the circuit board 180 through the first and second leads 120a and 120b for using the information as basic information for controlling charging and discharging operations of the battery cells 10.

The circuit board 180 is placed on the first tab plate 110a and is thus relatively close to the first tab plate 110a and relatively distant from the second tab plate 110b. Therefore, the second lead 120b may extend longer than the first lead 120a. That is, since the second lead 120b extends from the second tab plate 110b placed on the second cover 100b to the circuit board 180 placed above the first cover 100a, the second lead 120b may be longer than the first lead 120a. In an embodiment, the second lead 120b may include bent portions 125 such that the second lead 120b may pass by the first and second laser weld zones L1 and L2 while extending across a lateral side of the case 100. Owing to the bent portions 125, the second lead 120b may extend while making tight contact with the lateral side of the case 100 without physical interference with the first and second laser weld zones L1 and L2 protruding from the lateral side of the case 100. Thus, the second lead 120b may be stably supported without electrical interference with the first lead 120a that may occur when the second lead 120b unstably comes off the lateral side of the case 100.

In an embodiment, the first and second leads 120a and 120b may be formed separately from the first and second tab plates 110a and 110b and may then be welded to the first and second tab plates 110a and 110b. For example, coupling portions 121a and 121b may be formed on ends of the first and second leads 120a and 120b for coupling with the first and second tab plates 110a and 110b, and connection portions 122a and 122b may be formed on the other ends of the first and second leads 120a and 120b for connection with the circuit board 180. In an embodiment of the present disclosure, the coupling portions 121a and 121b formed on the ends of the first and second leads 120a and 120b, and the connection portions 122a and 122b formed on the other ends of the first and second leads 120a and 120b may all be welding portions.

In a case of forming the first and second leads 120a and 120b respectively in one piece with the first and second tab plates 110a and 110b instead of forming the first and second leads 120a and 120b separately from the first and second tab plates 110a and 110b, material costs may increase due to metal scrap remaining after a base metal sheet cutting process. In particular, if the second lead 120b which is relatively long is formed in one piece with the second tab plate 110b, a large amount of metal scrap may remain, and, thus, material costs may excessively increase. In addition, if a bending process is performed on the second lead 120b independently of the second tab plate 110b, the bending process may be easily performed. Therefore, in an embodiment, at least the second lead 120b may be formed separately from the second tab plate 110b.

In another embodiment of the present disclosure, the first lead 120a having a relatively short length may extend from the first tab plate 110a after being continuously bent from the first tab plate 110a, and the second lead 120b having a relatively long length may be formed separately from the second tab plate 110b and may then be welded to the second tab plate 110b.

In an embodiment, the first lead 120a may include a plurality of first leads 120a extending from a plurality of first tab plates 110a. Similarly, the second lead 120b may include a plurality of second leads 120a extending from a plurality of second tab plates 110b. In an embodiment, the first and second leads 120a and 120b may be arranged in an alternating pattern such that the first leads 120a may be placed between the second leads 120b neighboring each other, and the second leads 120b may be placed between the first leads 120a neighboring each other. As described above, since the first and second leads 120a and 120b are arranged in an alternating pattern, electrical interference between the first and second leads 120a and 120b may be prevented or substantially prevented, and electrical insulation may be provided between the first and second leads 120a and 120b.

In an embodiment, the first and second leads 120a and 120b may be intensively arranged along first long-side portions 100L1 of the first and second covers 100a and 100b. For example, when the first and second covers 100a and 100b include first and second long-side portions 100L1 and 100L2 opposite each other, the first and second leads 120a and 120b may be intensively arranged along the first long-side portions 100L1 of the first and second covers 100a and 100b but may not be arranged on the second long-side portions 100L2 opposite the first long-side portions 100L1. In this case, the first long-side portions 100L1 of the first and second covers 100a and 100b may make contact with the same lateral side of the case 100, for example, the same lateral side of the middle case 100c.

In an embodiment of the present disclosure, the coupling portions 121a and 121b formed on the ends of the first and second leads 120a and 120b, and the connection portions 122a and 122b formed on the other ends of the first and second leads 120a and 120b may all be welding portions, for example, laser welding portions. In an embodiment, since the first and second leads 120a and 120b are intensively arranged along the first long-side portions 100L1 of the first and second covers 100a and 100b, laser welding workability may be improved, and a laser beam emission position may not be changed from the first long-side portions 100L1 to the second long-side portions 100L2 or the positions of the first and second covers 100a and 100b may not be changed during a laser welding process.

In an embodiment of the present disclosure, the first tab plates 110a may connect in series the first end portions 11 of the first and second battery cells 10a and 10b having opposite polarities, and the second tab plates 110b may connect in series the second end portions 12 of the first and second battery cells 10a and 10b having opposite polarities. In an embodiment, the first and second tab plates 110a and 110b may be arranged in a zigzag pattern on the first and second covers 100a and 100b to connect different pairs of the first and second battery cells 10a and 10b, and, thus, the first and second leads 120a and 120b extending from the first and second tab plates 110a and 110b may also be arranged in an alternating pattern. For example, the first and second tab plates 110a and 110b may be alternately arranged along the first long-side portions 100L1 of the first and second covers 100a and 100b, and the first and second leads 120a and 120b extending from the first and second tab plates 110a and 110b may be alternately arranged along the first long-side portions 100L1 of the first and second covers 100a and 100b.

In an embodiment, since the first and second leads 120a and 120b are arranged along the first long-side portions 100L1 of the first and second covers 100a and 100b, the connection portions 122a and 122b forming end portions of the first and second leads 120a and 120b may be connected to a first side portion 181 of the circuit board 180. That is, the connection portions 122a and 122b of the first and second leads 120a and 120b may be arranged in a row along the first side portion 181 of the circuit board 180. The expression "the connection portions 122a and 122b of the first and second leads 120a and 120b are arranged in a row" may mean that the connection portions 122a and 122b of the first and second leads 120a and 120b are arranged in one direction along the first side portion 181 of the circuit board 180 without overlapping each other. Here, the first side portion 181 of the circuit board 180 may correspond to an edge portion of the circuit board 180 extending straight and continuously in one direction but may not include edge portions extending in different directions. In an embodiment of the present disclosure, the first and second leads 120a and 120b may be intensively connected to the first side portion 181 of the circuit board 180, but may not be connected to a second side portion 182 of the circuit board 180 opposite the first side portion 181.

As described above, since the connection portions 122a and 122b of the first and second leads 120a and 120b are intensively connected to the first side portion 181 of the circuit board 180, a conductive path of the circuit board 180 connected to the first and second leads 120a and 120b may be shortened. For example, the conductive path may be shortened by placing a circuit for processing data transmitted through the first and second leads 120a and 120b at a position close to the first side portion 181 of the circuit board 180.

In an embodiment, the connection portions 122a and 122b of the first and second leads 120a and 120b may be arranged in an alternating pattern along the first side portion 181 of the circuit board 180. Since the first and second leads 120a and 120b are arranged in an alternating pattern, the connection portions 122a and 122b forming end portions of the first and second leads 120a and 120b may be arranged in an alternating pattern along the first side portion 181 of the circuit board 180.

The circuit board 180 may receive information about states of the battery cells 10 through the first and second leads 120a and 120b and may control charging and discharging operations of the battery cells 10 based on the state information. The circuit board 180 may be provided on the first tab plates 110a on a side of the first cover 100a. That is, the circuit board 180 may be provided on a side of the first cover 100a instead of being provided on a side of the middle case 100c.

In an embodiment, the first tab plates 110a may be directly connected to the first end portions 11 of the battery cells 10 making contact with the cooling fluid and may be in thermal contact with the cooling fluid through the first cover 100a with which the first tab plates 110a make tight contact. Thus, the circuit board 180 placed on the first tab plates 110a may be cooled through the first tab plates 110a.

In an embodiment, like the first tab plates 110a, the second tab plates 110b may be directly connected to the second end portions 12 of the battery cells 10 making contact with the cooling fluid and may be in thermal contact with the cooling fluid through the second cover 100b with which the second tab plates 110b make tight contact. As described above, according to the present disclosure, the first and second tab plates 110a and 110b at which heat may be intensively generated due to concentration of charging and discharging currents may be cooled using the cooling fluid flowing in the case 100. Therefore, the temperature of the first and second tab plates 110a and 110b may be lowered to decrease the electrical resistance of charging and discharging passages, and circuit components mounted on the circuit board 180 may be cooled through the first tab plates 110a. Although not shown in the drawings, according to an embodiment of the present disclosure, an insulative member may be placed between the first tab plates 110a and the circuit board 180 to provide insulation therebetween.

Figure 12:
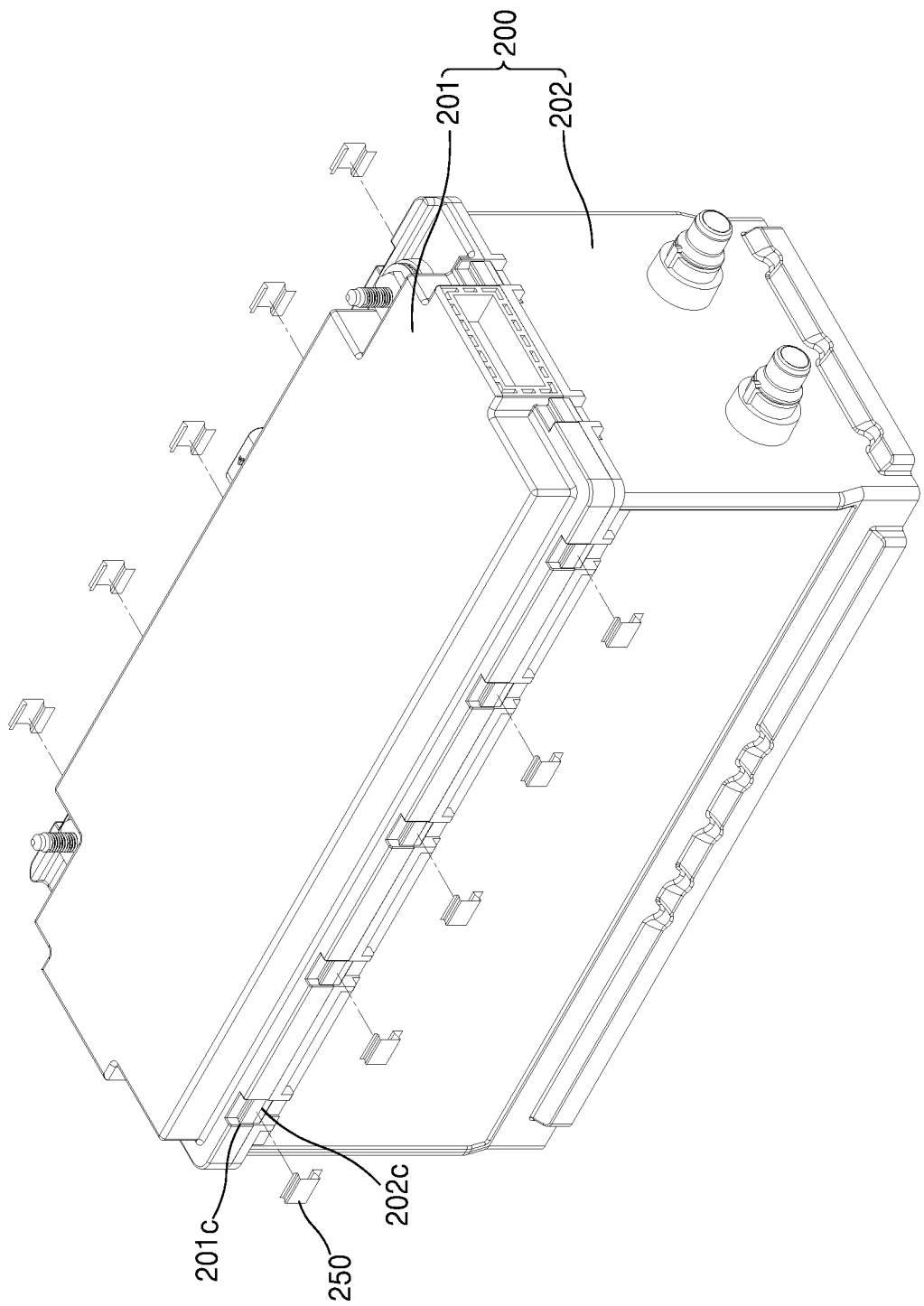
FIG. 12 is an exploded perspective view illustrating a housing accommodating a core pack shown in FIG. 11, according to an embodiment of the present disclosure.

FIG. 12 is an exploded perspective view illustrating a housing accommodating a core pack shown in FIG. 11, according to an embodiment of the present disclosure.

Referring to FIGS. 11 and 12, according to an embodiment of the present disclosure, a battery pack may include: a core pack CP including a case 100 in which a plurality of battery cells 10 are accommodated, a circuit board 180 being mounted on an outside of the core pack CP; and a housing 200 accommodating the core pack CP. In addition, the housing 200 may include a housing main body 202 and a housing cover 201 that face each other and are coupled to each other with the core pack CP therebetween.

In an embodiment, the housing main body 202 and the housing cover 201 may include different materials. For example, the housing main body 202 may include a metallic material, such as aluminum, and the housing cover 201 may include a resin material for injection molding. The housing main body 202 and the housing cover 201 may be coupled to each other in a mutually-facing direction with the core pack CP therebetween. For example, the housing main body 202 and the housing cover 201 including different materials may be coupled to each other by a clipping structure. That is, clip recesses 201c and 202c to which clips 250 may be fitted may be formed in the housing cover 201 and the housing main body 202, and, after aligning the clip recesses 201c and 202c of the housing cover 201 and the housing main body 202 with each other, the clips 250 may be fitted to the clip recesses 201c and 202c adjoining each other to couple the housing cover 201 and the housing main body 202 to each other.

In an embodiment, the housing main body 202 provides a space in which the core pack CP is entirely or mostly accommodated, and the housing cover 201 covers an upper portion of the housing main body 202 to seal the space. In an embodiment, the housing main body 202 may include a metallic material, such as aluminum or an aluminum alloy, to provide structural rigidity of the battery pack and heat-dissipating performance, and an electric device packed with an insulative material, such as a relay 185 (refer to FIG. 11) packed with an insulative resin, may be placed on a side of the circuit board 180 facing the housing main body 202 for electrical insulation between the circuit board 180 and the housing main body 202. According to an embodiment of the present disclosure, the core pack CP shown in FIG. 11 may be accommodated in the housing main body 202 in a state such that the circuit board 180 may face a lateral side of the housing main body 202, and, in this case, the circuit board 180 and the housing main body 202 may be insulated from each other owing to the relay 185 (refer to FIG. 11) placed between the circuit board 180 and the lateral side of the housing main body 202.

According to the present disclosure, the formation of passages for discharging gas generated from the battery cells 10 is provided. In particular, according to the present disclosure, the battery cells 10 are arranged at offset levels, and emission or discharge passages are provided using height difference spaces formed between the end portions of neighboring battery cells. Therefore, additional ribs or ducts for forming emission or discharge passages of the battery cells are not used.

It is to be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
   battery cells comprising first battery cells and second battery cells, each of the first and second battery cells comprising a first end portion and a second end portion that are opposite each other in a length direction of the respective battery cell, adjacent first end portions being arranged in a stepped manner; and
   a case providing an accommodation space in which the battery cells and a cooling fluid to cool the battery cells are configured to be accommodated, the case comprising a first cover covering the first end portions of the battery cells, the first cover being arranged along a height difference between the first end portions of the first and second battery cells and defining a height difference space, corresponding to the height difference, on an outer side of the first cover, the height difference space defining a recessed portion extending from a first region thereof to a second region thereof, the first and second regions of the recessed portion respectively overlapping the first end portions of adjacent second battery cells of the second battery cells.

2. The battery pack of claim 1, wherein the first end portion of the first battery cell relatively protrudes, and the first end portion of the second battery cell is relatively recessed.

3. The battery pack of claim 2, wherein the first cover comprises:
   a protruding portion that relatively protrudes to cover the first end portion of the first battery cell;
   the recessed portion that is relatively recessed to cover the first end portion of the second battery cell; and
   a stepped portion connecting the protruding portion and the recessed portion to each other while extending along the height difference between the first end portions of the first and second battery cells,
   wherein the height difference space is defined on an outer side of the recessed portion.

4. The battery pack of claim 2, wherein the height difference space is defined on an outer side of the first end portion of the second battery cell that is relatively recessed.

5. The battery pack of claim 4, wherein the first end portion of the second battery cell has a gas discharge hole.

6. The battery pack of claim 5, wherein the gas discharge hole is around a center portion of the first end portion of the second battery cell, the center portion being electrically connected to a first tab plate.

7. The battery pack of claim 6, wherein the first cover has a first terminal hole to expose the center portion and the gas discharge hole.

8. The battery pack of claim 7, wherein the gas discharge hole is in communication with the height difference space through the first terminal hole.

9. The battery pack of claim 2, wherein the first and second battery cells are adjacent to each other and arranged in rows, and
   the height difference space comprises a channel crossing the first cover along a row of the second battery cells.

10. The battery pack of claim 2, wherein the first end portions of the first and second battery cells have different electrical polarities and are spatially stepped from each other.

11. The battery pack of claim 2, wherein the second end portion of the first battery cell is relatively recessed, and
    the second end portion of the second battery cell relatively protrudes.

12. The battery pack of claim 11, wherein the case further comprises a second cover covering the second end portions of the first and second battery cells, and
    the second cover is arranged along a height difference between the second end portions of the first and second battery cells and defines another height difference space, corresponding to the height difference between the second end portions of the first and second battery cells, on an outer side of the second cover.

13. The battery pack of claim 1, further comprising a first tab plate on the outer side of the first cover to electrically connect the first end portions of the first and second battery cells, and
    the height difference space is defined between the first cover and the first tab plate.

14. The battery pack of claim 13, wherein the first tab plate comprises:
    a main portion on the first cover; and
    first and second contact portions protruding to different depths from the main portion toward the first end portions of the first and second battery cells.

15. The battery pack of claim 14, wherein the first and second contact portions are thinner than the main portion.

16. The battery pack of claim 15, wherein the first and second contact portions are respectively coupled to the first end portions of the first and second battery cells.

17. The battery pack of claim 14, wherein the first cover has first terminal holes to respectively partially expose the first end portions of the first and second battery cells, the first contact portion is connected to the first end portion of the first battery cell through the first terminal hole of the first cover, and the second contact portion is connected to the first end portion of the second battery cell through the height difference space and the first terminal hole of the first cover.

18. The battery pack of claim 17, wherein the protruding depth of the second contact portion is greater than the protruding depth of the first contact portion.

19. The battery pack of claim 14, wherein each of the first and second contact portions has a truncated cone shape with a cross-sectional area gradually decreasing along the protruding depth.

20. The battery pack of claim 14, wherein the first tab plate connects a row of the first battery cells and a row of the second battery cells that are adjacent to each other;

the first end portions of the first battery cells having the same polarity are connected in parallel to each other, and the first end portions of the second battery cells having the same polarity are connected in parallel to each other;

the first end portions of the first and second battery cells having opposite polarities are connected in series to each other; and a plurality of the first contact portions are arranged in a row on the main portion, and a plurality of the second contact portions are arranged in a row on the main portion.

21. The battery pack of claim 1, wherein the height difference between the first end portions of the first and second battery cells is in a range of about 3 mm to about 12 mm.

22. The battery pack of claim 21, wherein the height difference between the first end portions of the first and second battery cells is in a range of about 4 mm to about 10 mm.

23. A battery pack comprising:

battery cells comprising first battery cells and second battery cells, each of the first and second battery cells comprising a first end portion and a second end portion that are opposite each other in a length direction of the respective battery cell;

a case providing an accommodation space in which the battery cells and a cooling fluid to cool the battery cells are configured to be accommodated, the case comprising a first cover covering the first end portions of the battery cells, the first cover being arranged along a height difference between the first end portions of the first and second battery cells and defining a height difference space, corresponding to the height difference, on an outer side of the first cover; and a first tab plate on the outer side of the first cover to electrically connect the first end portions of the first and second battery cells, the first tab plate comprising a main portion on the first cover, and first and second contact portions protruding to different depths from the main portion toward the first end portions of the first and second battery cells, wherein the first and second contact portions are thinner than the main portion.

24. A battery pack comprising:

battery cells comprising first battery cells and second battery cells, each of the first and second battery cells comprising a first end portion and a second end portion that are opposite each other in a length direction of the respective battery cell, adjacent first end portions being arranged in a stepped manner; and a case providing an accommodation space in which the battery cells and a cooling fluid to cool the battery cells are configured to be accommodated, the case comprising a first cover covering the first end portions of the battery cells, the first cover being arranged along a height difference between the first end portions of the first and second battery cells and defining a height difference space, corresponding to the height difference, on an outer side of the first cover, the height difference space defining a recessed portion extending from a first region thereof to a second region thereof, the first and second regions of the recessed portion respectively overlapping the first end portions of adjacent second battery cells of the second battery cells, wherein the first cover comprises:

a protruding portion that relatively protrudes to cover the first end portion of the first battery cell; and the recessed portion that is relatively recessed to cover the first end portion of the second battery cell.

* * * * *